(12) United States Patent
Rosenzweig et al.

(10) Patent No.: US 9,985,306 B2
(45) Date of Patent: *May 29, 2018

(54) HYDROGEN-GENERATING FUEL CELL CARTRIDGES

(71) Applicant: Intelligent Energy Limited, Loughborough, Leicestershire (GB)

(72) Inventors: Alain Rosenzweig, Saint Maur des Fosses (FR); Andrew J. Curello, Hamden, CT (US); Paul Spahr, Durham, CT (US); Michael R. Curello, Cheshire, CT (US)

(73) Assignee: Intelligent Energy Limited, Loughborough (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/958,806

(22) Filed: Dec. 3, 2015

(65) Prior Publication Data

US 2016/0087294 A1  Mar. 24, 2016

Related U.S. Application Data

(63) Continuation of application No. 13/126,964, filed as application No. PCT/US2009/063108 on Nov. 3, 2009, now Pat. No. 9,236,626.

(Continued)

(51) Int. Cl.
  *C01B 3/50* (2006.01)
  *H01M 8/06* (2016.01)
  (Continued)

(52) U.S. Cl.
  CPC .......... *H01M 8/0606* (2013.01); *C01B 3/065* (2013.01); *C01B 3/50* (2013.01); *C01B 3/501* (2013.01);
  (Continued)

(58) Field of Classification Search
  CPC .................................................... C01B 3/065
  See application file for complete search history.

(56) References Cited

U.S. PATENT DOCUMENTS 150,995 A    5/1874  Zwietusch
2,925,334 A  2/1960  Henze et al.
(Continued)

FOREIGN PATENT DOCUMENTS

JP    2003-146605 A    5/2003
WO   WO 2006/088450 A1   8/2006
(Continued)

OTHER PUBLICATIONS

International Search Report issued in connection with the PCT/US2009/063108 dated Dec. 29, 2009.

(Continued)

*Primary Examiner* — Matthew J Merkling
(74) *Attorney, Agent, or Firm* — Baker & Hostetler LLP

(57) ABSTRACT

The present application is directed to a gas-generating apparatus (10). Hydrogen is generated within the gas-generating apparatus and is transported to a fuel cell. The generation of hydrogen is regulated automatically by the selective exposure of a catalyst (48) to the fuel mixture depending on the pressure inside the reaction chamber (28) of the gas-generating apparatus. Catalyst sealing mechanisms (40, 42) are provided at least partially within the reaction chamber to regulate the hydrogen pressure and to minimize the fluctuations in pressure of the hydrogen received by the fuel cell.

14 Claims, 19 Drawing Sheets

Related U.S. Application Data

(60) Provisional application No. 61/110,780, filed on Nov. 3, 2008, provisional application No. 61/140,313, filed on Dec. 23, 2008.

(51) Int. Cl.
*H01M 8/0606* (2016.01)
*C01B 3/06* (2006.01)
*H01M 8/04082* (2016.01)
*H01M 8/04537* (2016.01)
*H01M 8/0612* (2016.01)
*H01M 8/065* (2016.01)
*H01M 8/0444* (2016.01)

(52) U.S. Cl.
CPC ... *H01M 8/04216* (2013.01); *H01M 8/04656* (2013.01); *H01M 8/065* (2013.01); *H01M 8/0631* (2013.01); *C01B 2203/066* (2013.01); *C01B 2203/107* (2013.01); *C01B 2203/1052* (2013.01); *C01B 2203/1058* (2013.01); *C01B 2203/1064* (2013.01); *H01M 8/0444* (2013.01); *Y02E 60/324* (2013.01); *Y02E 60/362* (2013.01); *Y02E 60/364* (2013.01); *Y02E 60/50* (2013.01)

(56) References Cited

U.S. PATENT DOCUMENTS

| | | |
|---|---|---|
| 3,416,985 A | 12/1968 | Dounoucos |
| 3,447,286 A | 6/1969 | Dounoucos |
| 3,453,086 A | 7/1969 | Harm |
| 3,459,510 A | 8/1969 | Litz et al. |
| 3,554,707 A | 1/1971 | Holmes et al. |
| 3,594,222 A | 7/1971 | Wells |
| 3,594,232 A | 7/1971 | Spahrbier |
| 4,024,229 A | 5/1977 | Smith et al. |
| 4,055,632 A | 10/1977 | Hoffman et al. |
| 4,258,422 A | 3/1981 | Dougherty et al. |
| 4,261,956 A | 4/1981 | Adlhart |
| 4,620,970 A | 11/1986 | Suzumori et al. |
| 4,699,637 A | 10/1987 | Iniotakis et al. |
| 4,797,259 A | 1/1989 | Matkovich et al. |
| 4,863,888 A | 9/1989 | Melville et al. |
| 5,131,927 A | 7/1992 | Bikson et al. |
| 5,804,329 A | 9/1998 | Amendola |
| 5,945,231 A | 8/1999 | Narayanan et al. |
| 5,992,008 A | 11/1999 | Kindler |
| 5,997,594 A | 12/1999 | Edlund et al. |
| 6,231,831 B1 | 5/2001 | Autenrieth et al. |
| 6,319,306 B1 | 11/2001 | Edlund et al. |
| 6,458,189 B1 | 10/2002 | Edlund et al. |
| 6,683,025 B2 | 1/2004 | Amendola et al. |
| 6,939,529 B2 | 9/2005 | Strizki et al. |
| 7,074,509 B2 | 7/2006 | Rosenfeld et al. |
| 7,147,955 B2 | 12/2006 | Adams |
| 7,329,470 B2 | 2/2008 | Adams et al. |
| 7,648,792 B2 | 1/2010 | Kaschmitter et al. |
| 8,636,826 B2 | 1/2014 | Curello et al. |
| 2003/0070487 A1 | 4/2003 | DaCosta et al. |
| 2003/0198862 A1 | 10/2003 | Struthers |
| 2004/0023087 A1 | 2/2004 | Redmond |
| 2004/0067195 A1 | 4/2004 | Strizki et al. |
| 2004/0202903 A1 | 10/2004 | Devos et al. |
| 2005/0158595 A1 | 7/2005 | Marsh et al. |
| 2006/0042210 A1 | 3/2006 | Dallas et al. |
| 2006/0185242 A1 | 8/2006 | Cha et al. |
| 2006/0188242 A1 | 8/2006 | Sugiura |
| 2006/0278287 A1 | 12/2006 | Fielden et al. |
| 2007/0062115 A1 | 3/2007 | Berry et al. |
| 2007/0184312 A1 | 8/2007 | Eickhoff |
| 2008/0014479 A1 | 1/2008 | Fiebig |
| 2008/0102347 A1 | 5/2008 | Blunk |
| 2008/0216906 A1 | 9/2008 | Curello et al. |
| 2008/0225378 A1 | 9/2008 | Weikert et al. |
| 2008/0248368 A1 | 10/2008 | Dadheech et al. |
| 2009/0142564 A1 | 6/2009 | Plissonier et al. |
| 2009/0313813 A1 | 12/2009 | Sato et al. |

FOREIGN PATENT DOCUMENTS

| | | |
|---|---|---|
| WO | WO 2006/135896 A2 | 12/2006 |
| WO | WO 2006/138228 A2 | 12/2006 |

OTHER PUBLICATIONS

Machine translation of JP 2003146605 to Suda Seijiro.
Extended European Search Report issued in connection with the corresponding European Patent Application No. 09824241.5 dated Jul. 9, 2014.
Livermore; "Here Come the Microengines"; The Industrial Physicist (Dec. 2001/Jan. 2002) p. 20-25.

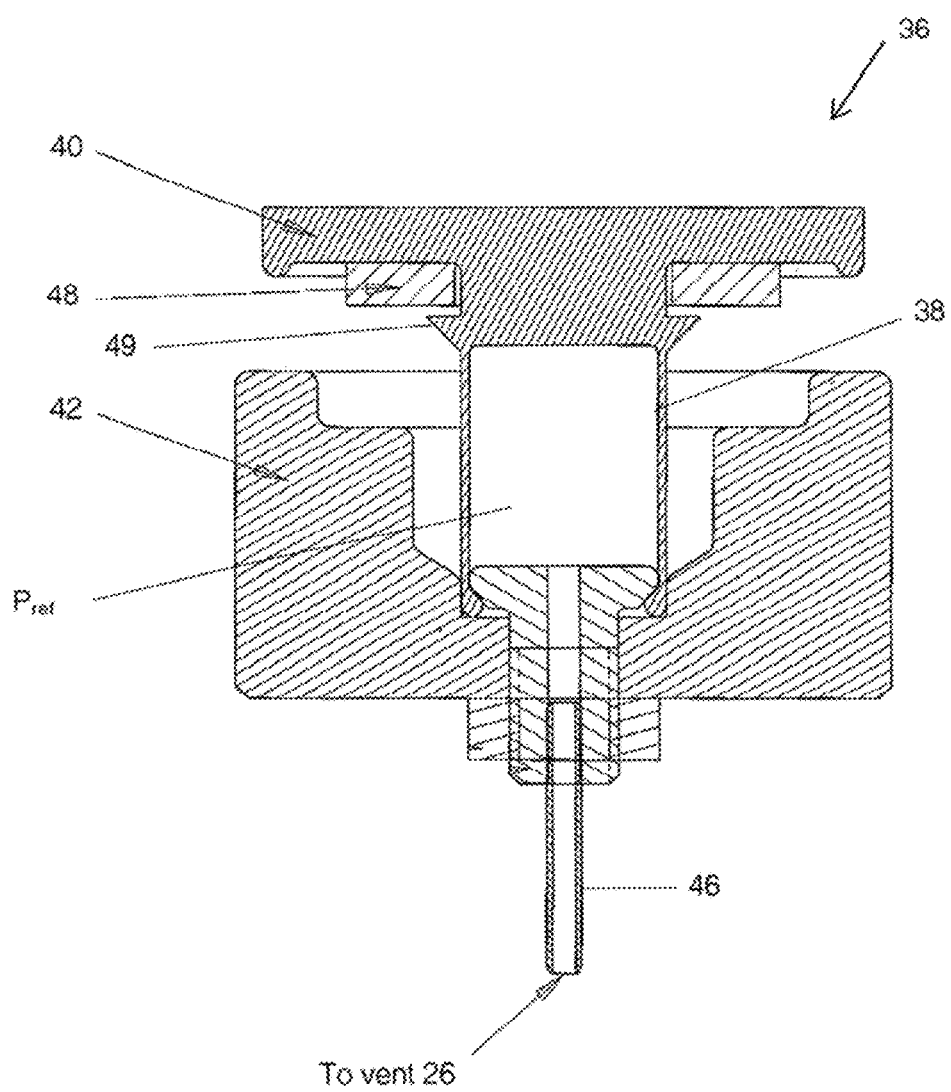

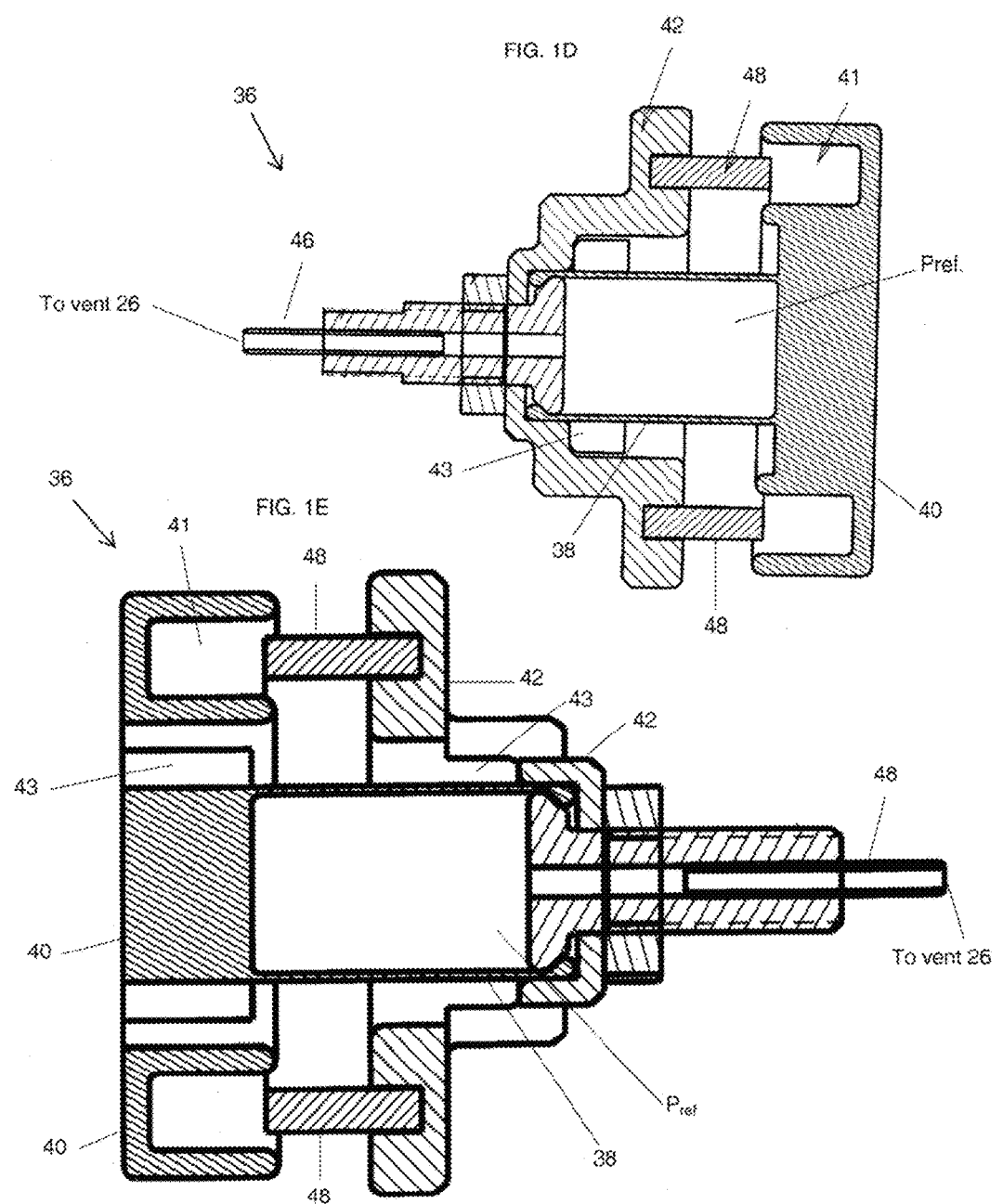

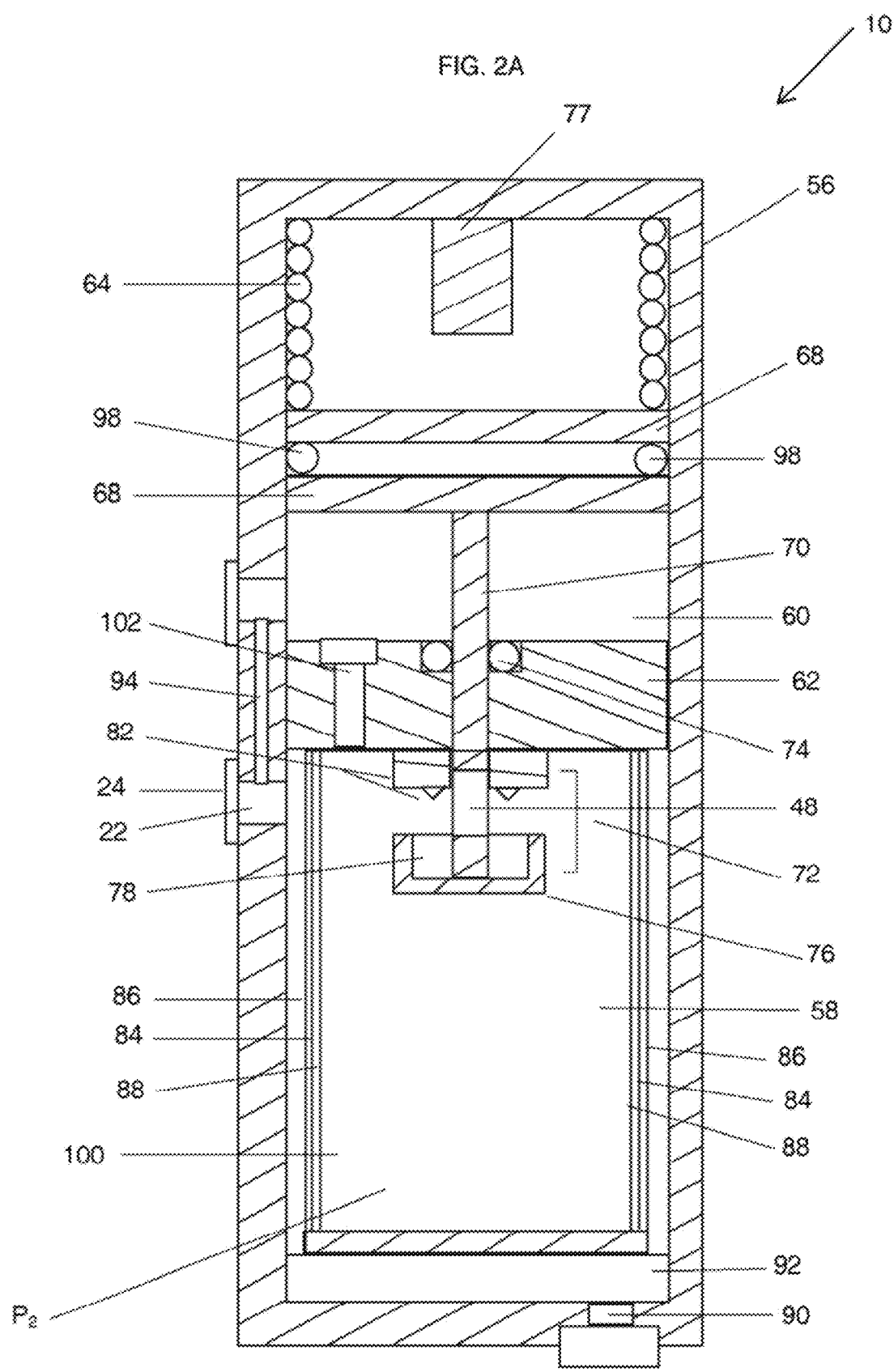

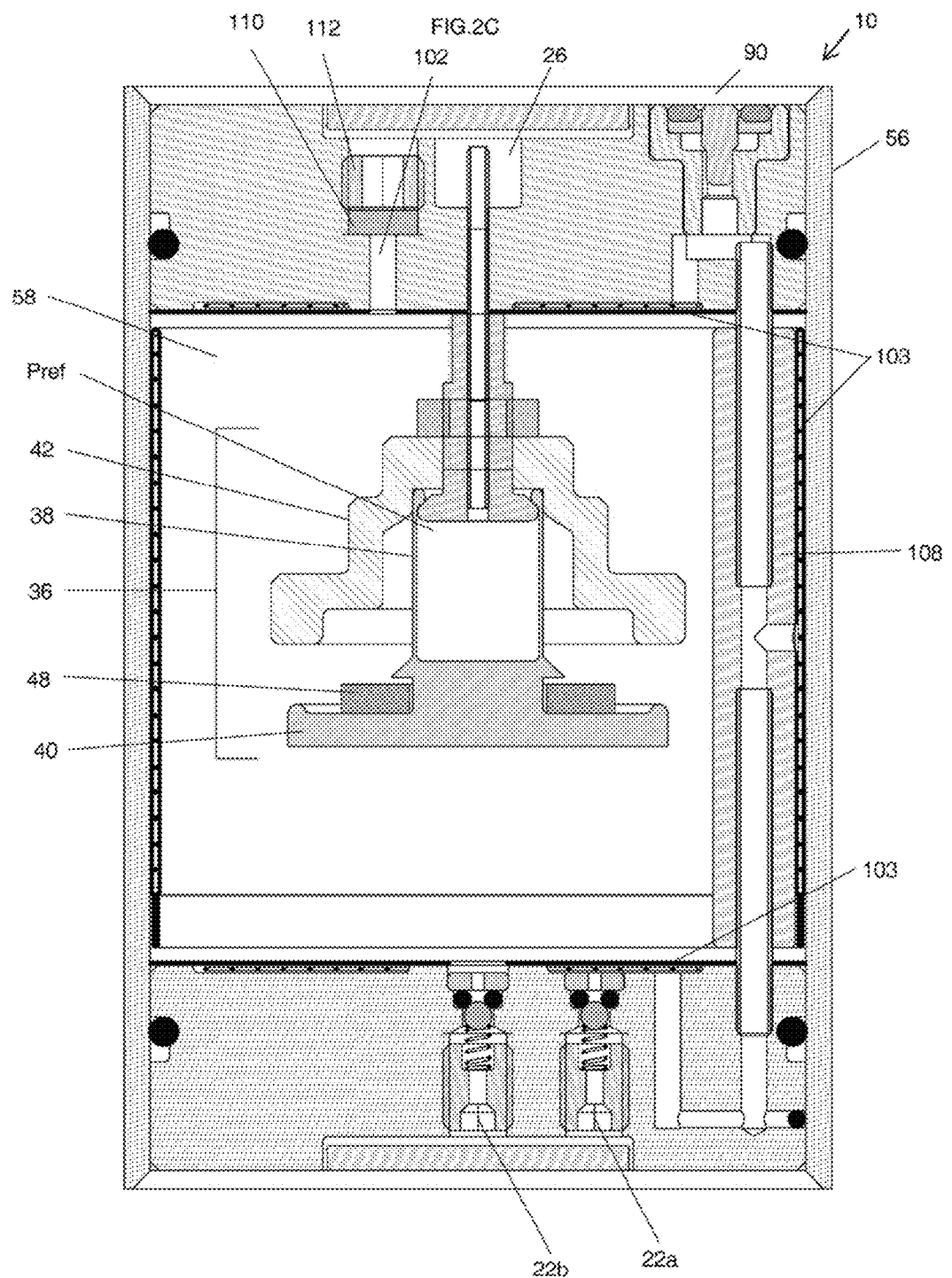

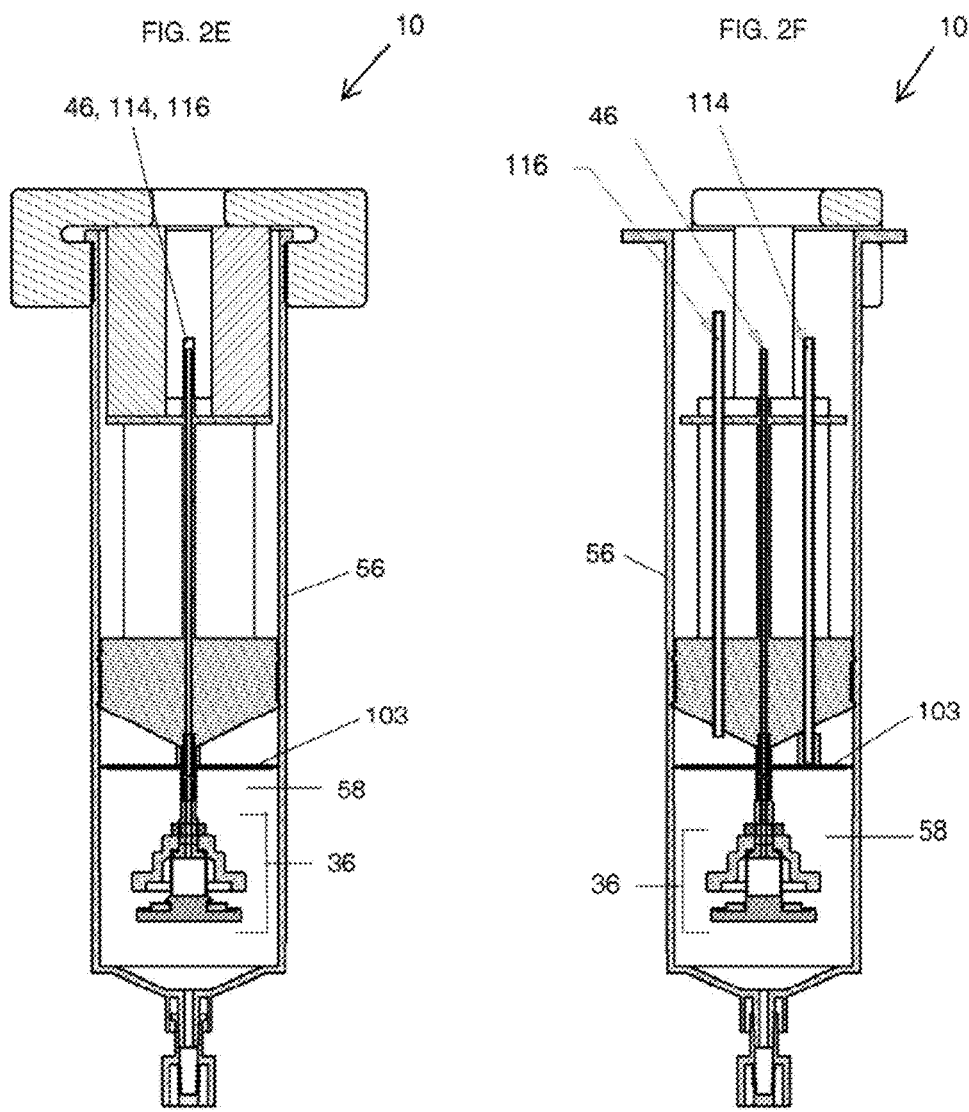

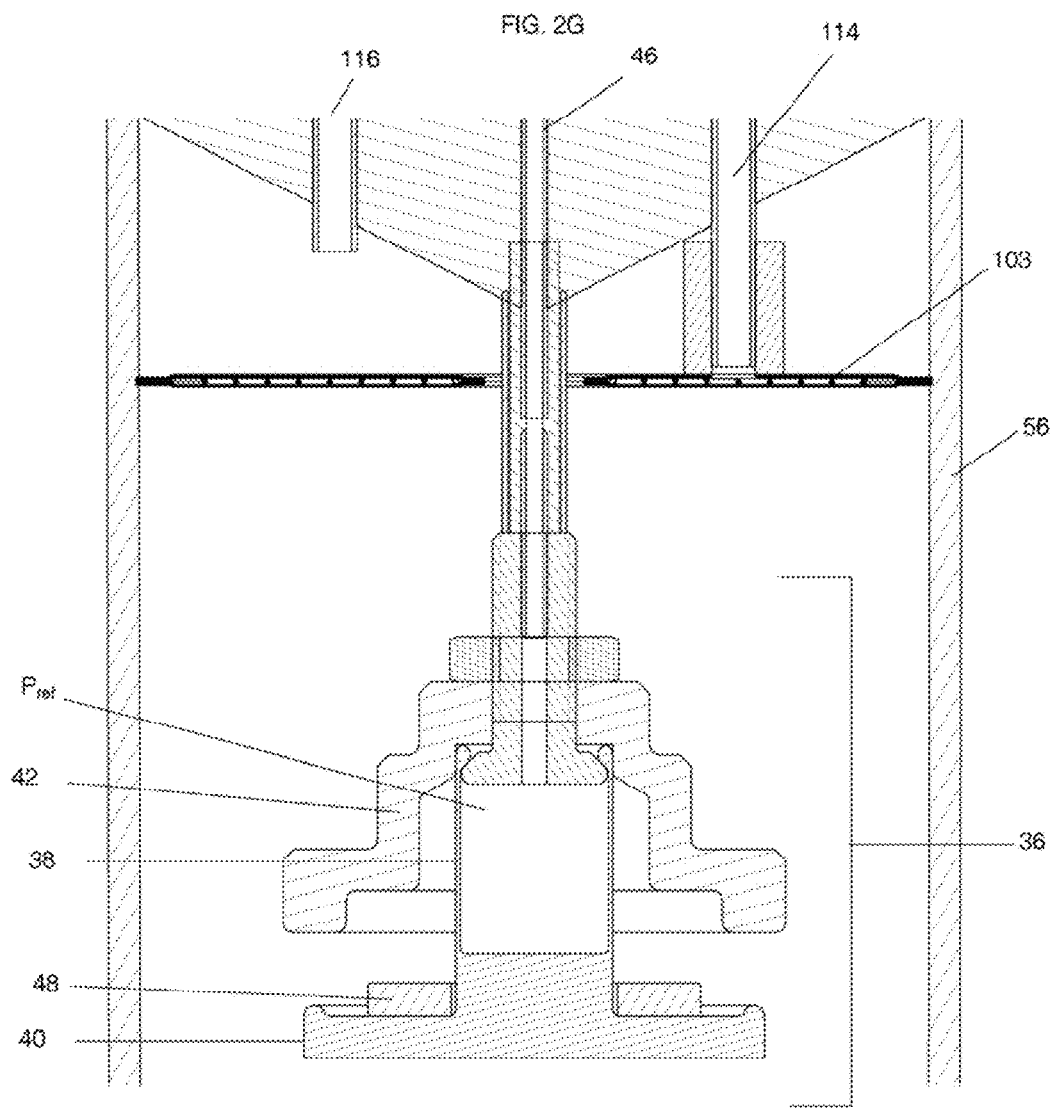

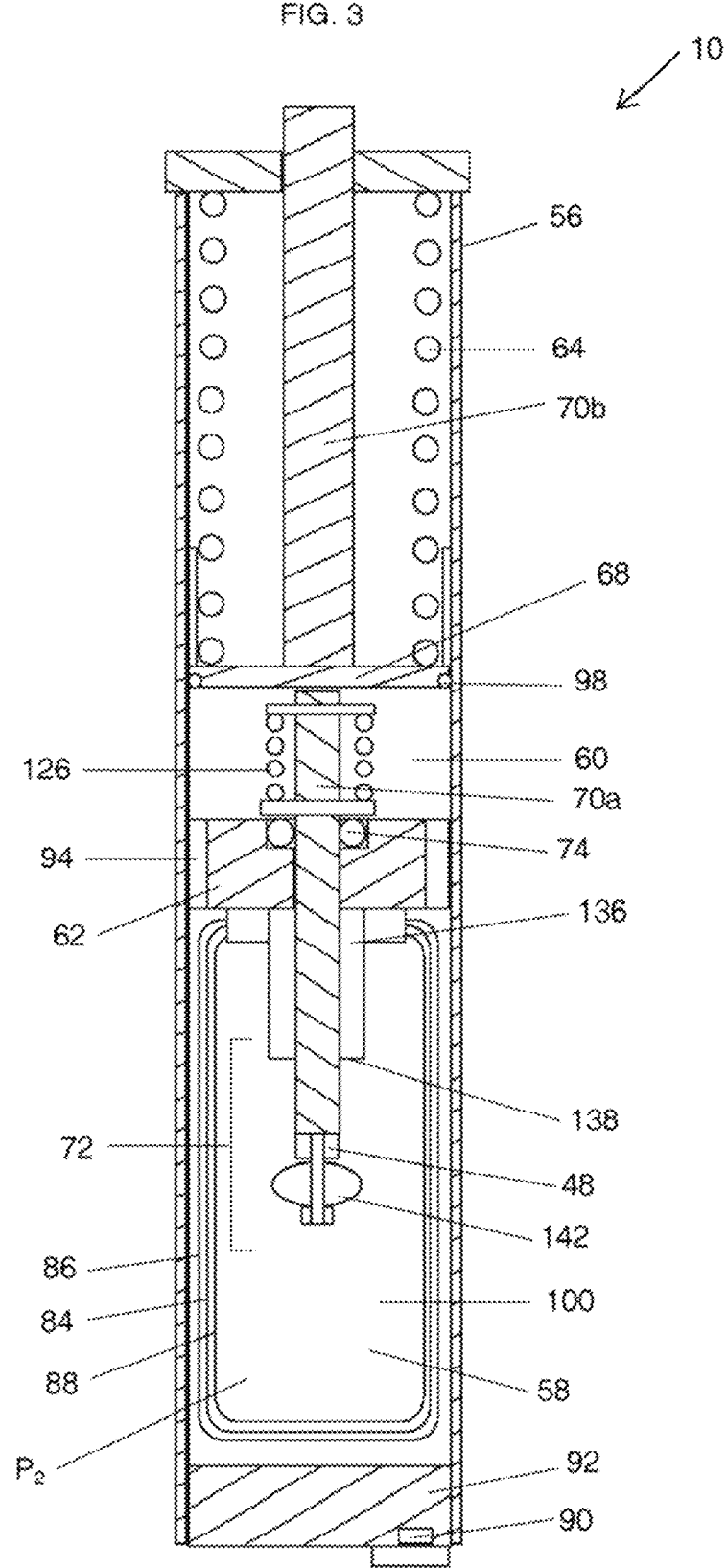

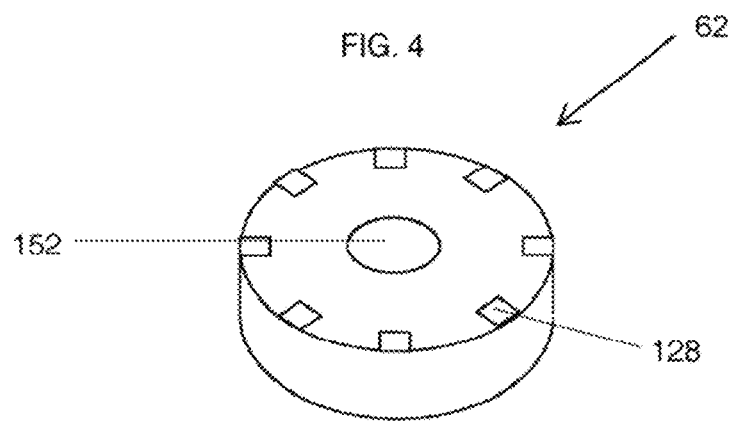
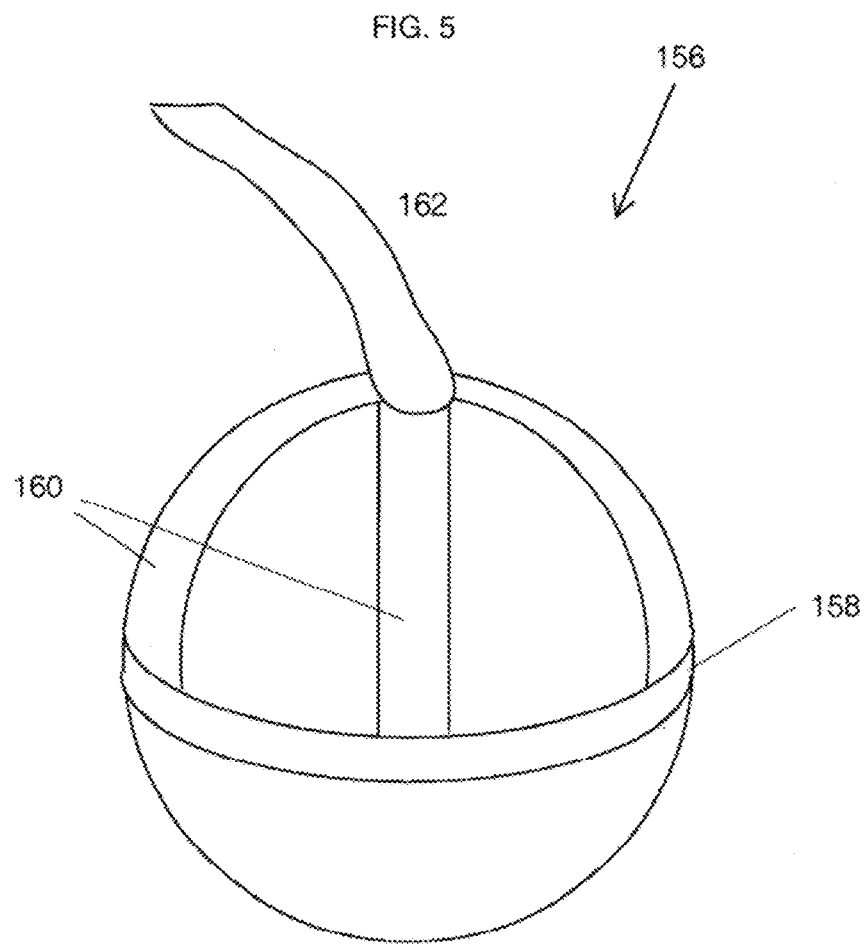

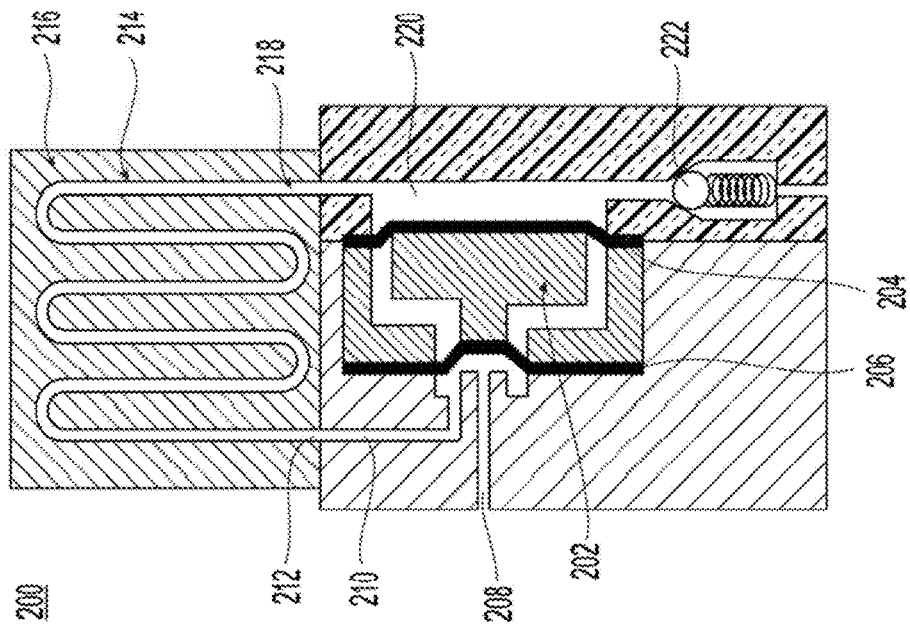
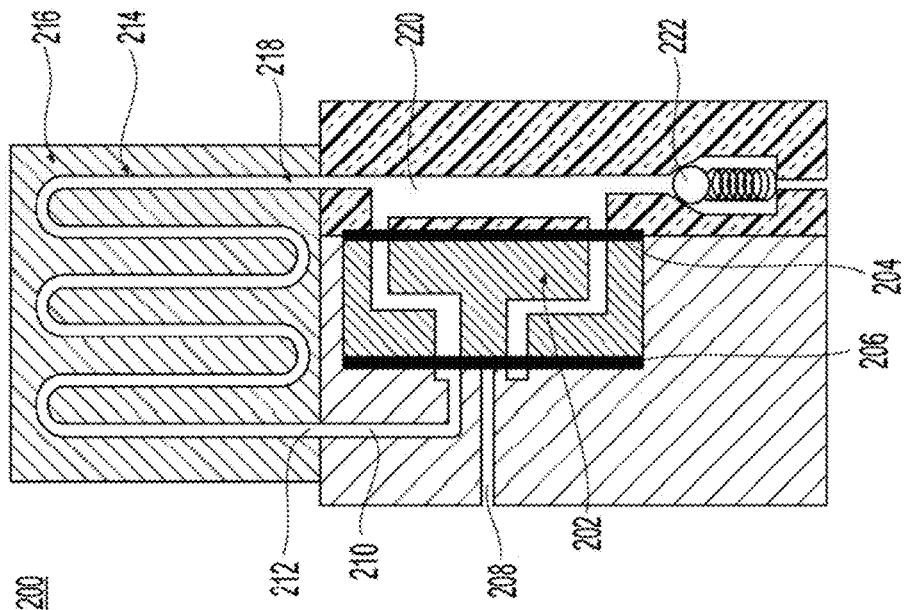
Fig. 7A
Fig. 7B

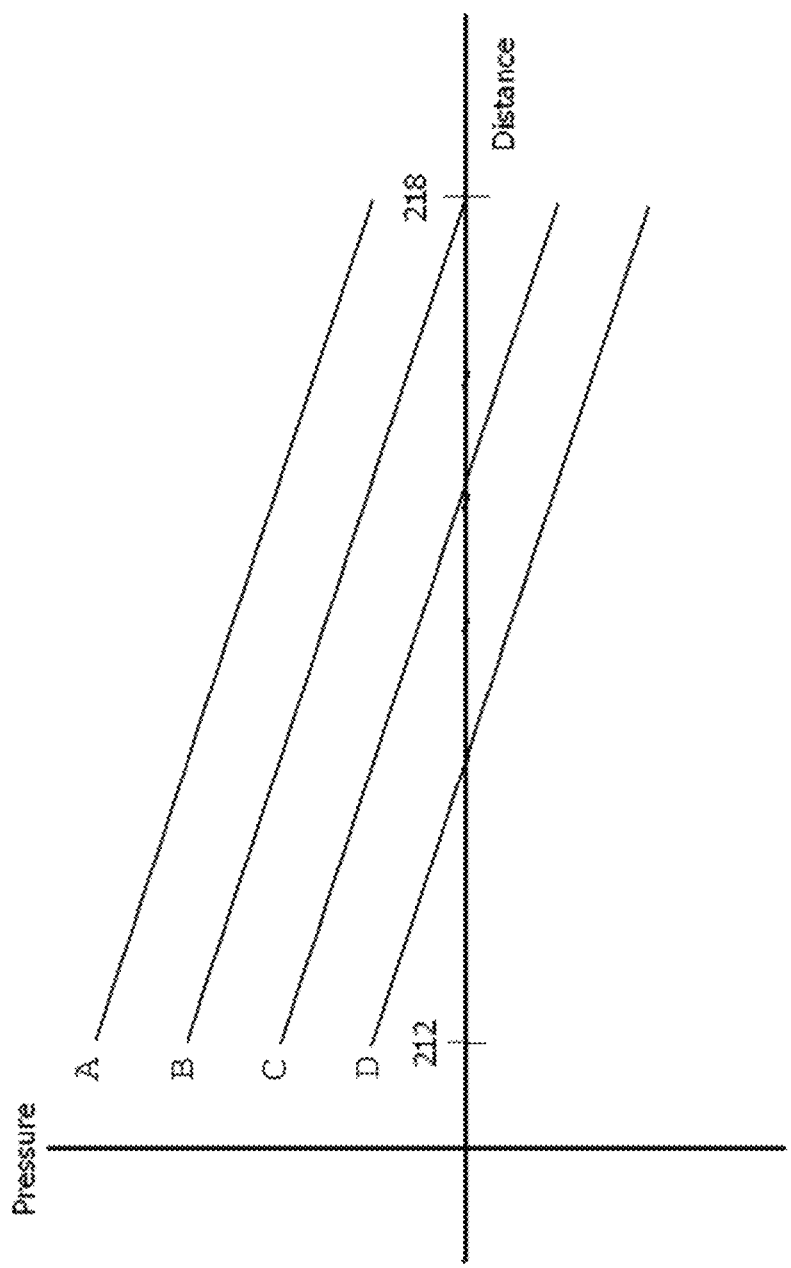

HYDROGEN-GENERATING FUEL CELL CARTRIDGES

CROSS-REFERENCE TO RELATED APPLICATIONS

The present application is a continuation of U.S. patent application Ser. No. 13/126,964, filed on Apr. 29, 2011, which is a U.S. national phase under 35 USC § 371 of, and claims priority to international patent application PCT/US2009/063108, filed on Nov. 3, 2009, which claims priority to U.S. provisional patent application No. 61/110,780, filed on Nov. 3, 2008, and U.S. provisional patent application No. 61/140,313, filed on Dec. 23, 2008. These applications are incorporated herein by reference in their entireties.

FIELD OF THE INVENTION

The invention relates generally to fuel supplies for fuel cells. In particular, the invention relates to fuel cartridges for fuel cells configured to produce a fuel gas on demand.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel, including proton exchange membrane (PEM) fuel cells; (ii) PEM fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For hydrogen gas powered fuel cells, the chemical reaction at each electrode and the overall reaction for a PEM fuel cell are described as follows:

Half-reaction at the anode:

$$H_2 \rightarrow 2H^+ + 2e^-$$

Half-reaction at the cathode:

$$0.5O_2 + 2H^+ + 2e^- \rightarrow H_2O$$

The overall fuel cell reaction:

$$H_2 + 0.5O_2 \rightarrow H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

DMFC is discussed in U.S. Pat. Nos. 5,992,008 and 5,945,231, which are incorporated by reference herein in their entireties.

In another direct oxidation fuel cell, borohydride fuel cell (DBFC) reacts as follows:

Half-reaction at the anode:

$$BH_4^- + 8OH^- \rightarrow BO_2^- + 6H_2O + 8e-$$

Half-reaction at the cathode:

$$2O_2 + 4H_2O + 8e- \rightarrow 8OH^-$$

In a chemical metal hydride fuel cell, sodium borohydride is reformed and reacts as follows:

$$NaBH_4 + 2H_2O \rightarrow (\text{heat or catalyst}) \rightarrow 4(H_2) + (NaBO_2)$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water by-product. Sodium borate ($NaBO_2$) by-product is also produced by the reforming process. A sodium borohydride fuel cell is discussed in U.S.

Pat. No. 4,261,956, which is incorporated by reference herein in its entirety. Chemical metal hydrides may also be used to produce compressed hydrogen for later transport to a fuel cell, where the hydrogen can undergo the hydrogen reaction detailed above.

One of the most important features for fuel cell application is fuel storage. Another important feature is to regulate the transport of fuel out of the fuel cartridge to the fuel cell. To be commercially useful, fuel cells such as DMFC or PEM systems should have the capability of storing sufficient fuel to satisfy the consumers' normal usage. For example, for mobile or cell phones, for notebook computers, and for personal digital assistants (PDAs), fuel cells need to power these devices for at least as long as the current batteries and, preferably, much longer. Additionally, the fuel cells should have easily replaceable or refillable fuel tanks to minimize or obviate the need for lengthy recharges required by today's rechargeable batteries.

One disadvantage of the known hydrogen gas generators using chemical hydride as fuel is that once the reaction starts, the gas generator cartridge cannot efficiently control the reaction. Thus, the reaction will continue until the supply of the reactants runs out or the source of the reactant is manually shut down. One early example of a chemical hydride hydrogen gas generator is disclosed in U.S. Pat. No. 3,594,222 to Spahrbier. One drawback of Spahrbier is that when the catalyst is immersed in an aqueous reservoir of fuel, and the catalyst is made selectively available to the fuel, hydrogen can form around the catalys when the catalyst is shielded from the fuel. When the catalyst is again open to the fuel, the hydrogen gas may continue to adhere to the catalyst due at least partially to surface tension of the gas bubble, thereby preventing the fuel from contacting the catalyst. Another drawback is that the actuating mechanism for exposing the catalyst to the fuel comprises a substantially planar diaphragm, which requires a relatively large surface area in order to achieve the proper sensitivity.

Accordingly, there is a desire to obtain a hydrogen gas generator apparatus that is capable of self-regulating the hydrogen-producing reaction to regulate the flow of fuel.

SUMMARY OF THE INVENTION

The present invention is directed toward fuel systems/gas-generating apparatus that have significantly longer shelf life and are more efficient in producing hydrogen. The gas-generating apparatus generates hydrogen and transfers the hydrogen to a fuel cell.

In one embodiment, the present invention relates to a gas-generating apparatus that includes a reaction chamber having a fuel mixture, wherein the fuel mixture may react to produce a gas in the presence of a catalyst, and a catalyst sealing mechanism disposed at least partially within the reaction chamber. The catalyst sealing mechanism has at least a first configuration and a second configuration, wherein the catalyst is contactable by the fuel mixture when the catalyst sealing mechanism is in the first configuration and the catalyst is not contactable by the fuel mixture when the catalyst sealing mechanism is in the second configuration. A pressure in the reaction chamber actuates the catalyst sealing mechanism between the first configuration and the second configuration. The catalyst sealing mechanism preferably has at least one fluid path that reintroduces the fuel mixture to the catalyst when the catalyst sealing mechanism moves from the second configuration to the first configuration. Also, the catalyst sealing mechanism has a non-planar, actuable member to actuate between the first and second configuration.

In another embodiment, the gas-generating apparatus of the present invention includes a reaction chamber having fuel mixture and a reactor buoy, where reactor buoy alternatively exposes a catalyst to the fuel mixture or seals the catalyst away from the fuel mixture depending on the pressure in the reaction chamber which is determined by the hydrogen requirements of a fuel cell.

According to one example of the present invention, the gas-generating apparatus includes a reaction chamber having a fuel mixture and a cup, wherein the cup may seal against a wall of the reaction chamber to seal the catalyst away from the fuel mixture, dependent on the pressure in the reaction chamber.

In another example, the gas-generating apparatus of the present invention includes a catalyst sealing system having a ball that is sealable against a shaft casing, depending on the pressure in the reaction chamber, wherein the ball may seal a catalyst away from the fuel mixture.

It is to be understood that both the foregoing general description and the following detailed description are exemplary and explanatory only and are intended to provide a further explanation of the present invention, as claimed.

BRIEF DESCRIPTION OF THE DRAWINGS

In the accompanying drawings, which form a part of the specification and are to be read in conjunction therewith:

FIGS. 1B and 1C illustrate alternative embodiments of a reactor buoy usable in the present invention. FIGS. 1D and 1E illustrate two orthogonal cross-sectional views of another embodiment of a reactor buoy usable in the present invention.

FIGS. 2A-2C illustrate cross-sectional views of several embodiments of the inventive hydrogen-generating apparatus. FIGS. 2E and 2F illustrate several cross sectional views of another embodiment of the inventive hydrogen generating apparatus. FIG. 2G illustrates a detail view of a portion of FIG. 2F.

FIG. 3 illustrates a cross sectional view of another embodiment of the inventive hydrogen-generating apparatus.

FIG. 4 illustrates a perspective view of barrier insert for use in the third embodiment of the inventive hydrogen-generating apparatus.

FIG. 5 illustrates a side view of an elastomeric ball for use with another embodiment of the inventive hydrogen-generating apparatus.

FIGS. 7A-B are a cross-sectional view of a fuel cell-fuel regulator system in the closed and open position, respectively, and FIG. 7C is a representative family of pressure drop curves within the fuel cell of FIGS. 7A-B.

DETAILED DESCRIPTION OF THE INVENTION

Figure 1A:
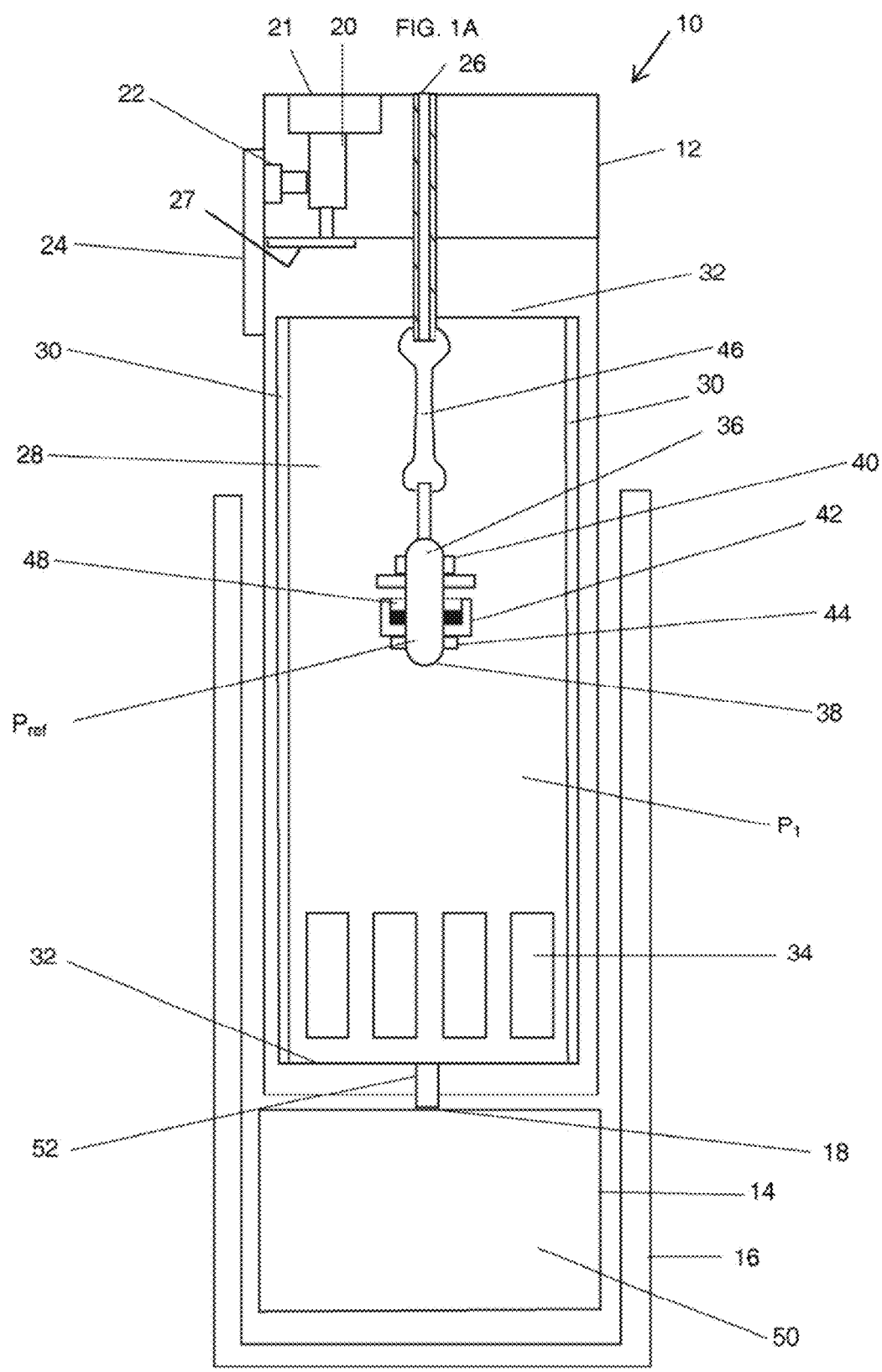
FIG. 1A illustrates a cross sectional view of one embodiment of the inventive hydrogen-generating apparatus.

As illustrated in the accompanying drawings and discussed in detail below, the present invention is directed to a fuel supply which produces hydrogen for use in fuel cells.

The fuel supply contains a fuel mixture and a catalyst. This fuel mixture is generally the solution formed by dissolving a solid fuel component in a liquid fuel component. The solid fuel component may be any solid which may be reacted to produce hydrogen gas, and preferably is a metal hydride such as sodium borohydride. Other metal hydrides are also usable, including, but not limited to, lithium hydride, lithium borohydride, sodium hydride, potassium hydride, potassium borohydride, lithium aluminum hydride, combinations, salts, and derivatives thereof. The solid fuel component may include other chemicals, such as solubility-enhancing chemicals or stabilizers, such as soluble metal hydroxides, and preferably includes sodium hydroxide. Other usable stabilizers include potassium hydroxide or lithium hydroxide, among others. The liquid fuel may be any fuel capable of reacting with a hydrogen bearing solid to produce hydrogen, and may include, but is not limited to, water or alcohols. The liquid fuel may also include additives, stabilizers, or other reaction enhancers, such as sodium hydroxide as a stabilizer, a polyglycol as a surfactant, or many others. The catalyst may be platinum, ruthenium, nickel, cobalt, and other metals and derivatives thereof. The preferred catalysts include cobalt chloride or ruthenium chloride, or both. Another preferred catalyst is a compound containing cobalt and boron. In the presence of the catalyst, the fuel mixture reacts to produce hydrogen. A preferred catalyst system is discussed in parent application U.S. provisional patent application 61/140,313, which is incorporated by reference in its entirety.

The fuel supply also includes a device to seal the catalyst away from the fuel mixture to stop the hydrogen production reaction when further hydrogen is not needed by a fuel cell. The device is controlled by the conditions inside the fuel supply, preferably the pressure of the reaction chamber. The device may thus adjust production to accommodate varying hydrogen demands from a fuel cell.

The term "solid fuel" as used herein includes all solid fuels that can be reacted to produce hydrogen gas, and includes, but is not limited to, all of the suitable chemical hydrides described herein, including additives and catalysts and mixtures thereof.

The term "liquid fuel" as used herein includes all liquid fuels that can be reacted to produce hydrogen gas, and includes, but is not limited to, suitable fuels described herein, including additives, catalysts, and mixtures thereof. Preferably, the liquid fuel, such as water or methanol, reacts with the solid fuel in the presence of catalyst to produce hydrogen.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to produce fuels that are not used in fuel cells. These applications can include, but are not limited to, producing hydrogen for micro gas-turbine engines built on silicon chips, discussed in "Here Come the Microengines," published in The Industrial Physicist (December 2001/January 2002) at pp. 20-25. As used in the present application, the term "fuel cell" can also include microengines.

The gas-generating apparatus of the present invention may include a reaction chamber, which may include a first reactant, a second reactant and a catalyst. The first and second reactants can be a metal hydride, e.g., sodium borohydride, and water or methanol. The reactants can be in gaseous, liquid, aqueous or solid form. Preferably, the first reactant is a solid chemical hydride or chemical borohydride and selected optional additives and stabilizers, and the second reactant is water or methanol optionally mixed with selected additives and stabilizers, such as sodium hydroxide. The catalyst may be platinum, ruthenium, cobalt, nickel, or other metals or compounds such as cobalt chloride or ruthenium chloride. Water and stabilized chemical hydride react in the presence of a catalyst to produce hydrogen gas, which can be consumed by a fuel cell to produce electricity. Alternately, liquid hydrogen peroxide and solid permanganate reactants can be used to produce oxygen using the gas generating apparatus of the present invention. Another suitable reaction to generate oxygen is disclosed in U.S. Pat. No. 4,620,970, which is incorporated herein by reference in its entirety.

The solid fuel and the liquid fuel can be stored in separate chambers and are mixed in situ before being transported to the reaction chamber, which houses the catalyst(s) such as those discussed in U.S. Pat. No. 7,329,470, which is incorporated herein by reference in its entirety. Alternatively the solid and liquid fuels are premixed and stored in an aqueous form in the reaction chamber or transferred to the reaction chamber when necessary.

Additionally, the gas-generating apparatus can include a device or system that is capable of controlling the exposure of the catalyst to the first and second reactants. Preferably, the catalyst sealing mechanism remains at least partially within the reaction chamber. The operating conditions inside the reaction chamber and/or the reservoir, preferably a pressure inside the reaction chamber, are capable of controlling the exposure of the catalyst to the reactants. For example, the catalyst can be exposed to the reactants when the pressure inside the reaction chamber is less than a first predetermined pressure, preferably less than a reference pressure, and, more preferably less than a reference pressure by a predetermined amount. It is preferable that the exposure of the catalyst to the reactants is self-regulated. Thus, when the reaction chamber reaches a second predetermined pressure, preferably a predetermined amount above a reference pressure, the catalyst can be sealed away from the reactants to stop the production of hydrogen gas. The first and second predetermined pressures can be substantially the same or the first predetermined pressure can be lower than the second predetermined pressure. The catalyst can be sealed away from the reactants by a number of inventive methods including, but not limited to, sealing it in a separate chamber, moving it to a part of the reaction chamber inaccessible to the reactants, covering it, or combinations thereof. Preferably, when using a stabilized aqueous metal hydride fuel, such as sodium borohydride, the catalyst is exposed and sealed from the fuel as described in the embodiments below.

Referring to FIG. 1A, an inventive hydrogen-generating apparatus 10 is shown. Hydrogen-generating apparatus 10 generally includes a housing 12, a liquid fuel bladder 14 and an actuator 16. A check valve 18 connects liquid fuel bladder 14 and housing 12 to chamber 28. Housing 12 comprises an outlet 20 to connect hydrogen-generating apparatus 10 to a fuel cell or other hydrogen consumer, a relief valve 22, a hydrogen consumer 24, and a reference pressure vent 26. Outlet 20 comprises a valve 21 and an optional gas-permeable, liquid-impermeable membrane 27 fixed over the reactor facing side of outlet 20. Membrane 27 limits the amount of liquids or by-products from being transferred out of hydrogen-generating apparatus 10 to the fuel cell via outlet 20 or to hydrogen consumer 24. Fillers or foam can be used in combination with membrane 27 to retain liquids or by-products and to reduce clogging. Membrane 27 may be formed from any liquid-impermeable, gas-permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or combinations thereof. Membrane 27 may also comprise GORE-TEX® and additionally, or alternatively, may include any of the gas-permeable liquid-impermeable materials disclosed in U.S. Pat. No. 7,147,955, incorporated herein by reference. Membrane 27 may also comprise a gas-permeable, liquid-impermeable membrane covering a porous member, such as a foam, a calcium hydroxide (CaOH) desiccant, a second hydrogen generator or a sponge. Such a membrane may be used in any of the embodiments discussed herein.

Valve 21 may also optionally be an exit pressure control valve. Such an exit pressure control valve can be any valve, such as a pressure-triggered valve (a check valve or a duckbill valve) or a pressure-regulating valve or pressure regulator. When valve 21 is a pressure-triggered valve, no hydrogen can be transferred until pressure $P_1$ inside housing 12 reaches a threshold pressure. Valve 21 may be positioned in outlet 20, or can be located remote from gas-generating device 10. A connection valve or shut-off valve may also be included, preferably in fluid communication with valve 21 or valve 21 can be a connection or a shut-off valve, or may include a separate integrated regulator.

Relief valve 22 is preferably a pressure-triggered valve, such as a check valve or a duckbill valve, which automatically vents produced fuel gas should pressure $P_1$ within housing 12 reach a specified triggering pressure. Hydrogen consumer 24 is preferably a miniature PEM fuel cell which converts excess hydrogen gas that would otherwise escape into the atmosphere through relief valve 22 into water or some other mechanism, such as a compound that reacts with free hydrogen to form an inert compound that converts hydrogen to an inert state. Hydrogen consumer 24 is attached to housing 12 covering relief valve 22. The anode side of hydrogen consumer 24 faces relief valve 22, and the cathode side is open to ambient air and in contact with oxygen. An electrical energy consuming device, such as a resistor or similar circuit or an electrical short is provided to consume electricity produced by hydrogen consumer 24. This mechanism can be electrically connected to the device as a safety shut-off. When relief valve 22 opens to vent the produced gas due to excessive pressure within housing 12, hydrogen contacts the anode side of hydrogen consumer 24. The hydrogen reacts across the PEM to produce electricity, consuming the excess hydrogen. Such PEM hydrogen consumer is disclosed in commonly-owned PCT Pub. Nos. WO 2006/0135896 A2 and WO 2006/0138228 A2, which are incorporated herein by reference in their entireties.

Within housing 12 is disposed a reaction chamber 28. Reaction chamber 28 comprises sidewalls 30 and hydrogen-permeable liquid-impermeable membranes 32. Sidewalls 30 are preferably made of a fluid-impenetrable material, such as a metal, for example, stainless steel, or a resin or plastic material. Disposed within reaction chamber 28 are solid fuel component 34 and reactor buoy 36. Solid fuel component 34 can be powders, granules, or other solid forms. Fillers and other additives and chemicals can be added to solid fuel component 34 to improve its solubility in the liquid reactant, or to retard or enhance its reaction with the liquid reactant. Solid fuel component 34 may comprise any solid fuel used for the production of hydrogen known in the art, and is preferably a chemical hydride or combination of hydrides, and more preferably is sodium borohydride or another suitable hydride fuel discussed below. Solid fuel may also include stabilizers or other additives, and preferably includes a water soluble metallic hydroxide as a stabilizer, preferably sodium hydroxide. Hydrogen-permeable membranes 32 may be any such membranes known in the art, and are preferably made of a single layer of a gas-permeable, liquid-impermeable material such as CELGARD® and GORE-TEX®. Other gas-permeable, liquid-impermeable materials usable in the present invention include, but are not limited to, SURBENT® Polyvinylidene Fluoride (PVDF) having a porous size of from about 0.1 μm to about 0.45 μm, available from Millipore Corporation. The pore size of SURBENT® PVDF regulates the amount of liquid fuel 50 or water exiting hydrogen-generating apparatus 10. Materials such as electronic vent-type material having 0.2 μm hydro, available from W. L. Gore & Associates, Inc., may also be used in the present invention. Additionally, sintered and/or ceramic porous materials having a pore size of less than about 10 μm, available from Applied Porous Technologies Inc., are also usable in the present invention. Additionally, or alternatively, the gas-permeable, liquid-impermeable materials disclosed in U.S. Pat. No. 7,147,955 are also usable in the present invention. Membrane 32 can be made from the same material as membrane 27. Using such materials allows for the hydrogen gas produced by the reaction of liquid fuel 50 and solid fuel component 34 to permeate through hydrogen permeable membrane 32 and into housing 12 for transfer to the fuel cell (not shown), while restricting the liquid and/or paste-like by-products of the chemical reaction to the interior of reaction chamber 28. Alternately, liquid fuel 50 can be stored initially within reaction chamber 28, and solid fuel 34 can be stored initially outside of reaction chamber 28.

Reactor buoy 36 comprises an elastomeric chamber 38, which is preferably a balloon, connecting a first end cap 40 to a cup 42 and a second end cap 44. Alternatively, cup 42 may be integral with elastomeric chamber 38. A tether 46 connects elastomeric chamber 38 to the reference pressure at vent 26. Tether 46 is preferably flexible. Tether 46 is hollow, and is in fluidic communication with elastomeric chamber 38 and vent 26 such that pressure $P_{ref}$ inside elastomeric chamber 38 is equal to atmospheric or another reference pressure. Alternatively, tether 46 is omitted and chamber 38 is sealed with a known and predetermined reference pressure. Catalyst 48 is disposed within cup 42 but can also be disposed on chamber 38 or cap 40.

Liquid fuel 50 is disposed in liquid fuel bladder 14 which is preferably kept separate from solid fuel 34 before the first use. Liquid fuel 50 comprises water or methanol, and may also include other additives/stabilizers, such as anti-freeze, or other liquid reactants. Additional appropriate fluid fuel components and other solids and additives are further discussed herein. Suitable additives/stabilizers include, but are not limited to, anti-freezing agents (e.g., methanol, ethanol, propanol and other alcohols), stabilizers (e.g., sodium hydroxide and other known stabilizers), pH adjusting agents (e.g., bases, such as sodium hydroxide, potassium hydroxide, and other bases) and anti-foaming agents (e.g., surfactants, such as polyglycol). A liquid fuel conduit 52 including check valve 18 connects liquid fuel bladder 14 to reaction chamber 28. Alternatively, check valve 18 may be replaced with another starting mechanism, such as a one-shot perforation or a frangible membrane or a frangible foil.

To operate hydrogen generating apparatus 10, housing 12 is squeezed by pushing actuator 16 toward reaction chamber 28. Preferably, actuator 16 incorporates a child resistant mechanism, such as a twist-push mechanism or other two-direction opening/closing mechanism. Suitable child resistant mechanisms are disclosed in commonly-owned International Pat. App. No. PCT/US 05/04826 published as WO 2006/088450 A1, which is incorporated herein by reference in its entirety. As shown, actuator 16 is disposed telescopically around reaction chamber 28. Other configurations can be used. This compresses liquid fuel bladder 14 and engages or opens check valve 18. Liquid fuel 50 is forced through check valve 18, through liquid fuel conduit 52, into reaction chamber 28. Liquid fuel 50 dissolves solid fuel component 34 to form an aqueous fuel mixture. Initially, pressure $P_1$ in reaction chamber 28 is not sufficiently high to close reactor buoy 36. While reactor buoy 36 is open, the aqueous fuel mixture contacts catalyst 48 inside reactor buoy 36. Catalyst 48 causes the fuel mixture to react to produce hydrogen. Hydrogen dissolves or permeates out of reaction chamber 28 through hydrogen permeable membranes 32. So long as valve 21 remains open, hydrogen passes out of hydrogen generating apparatus 10. If valve 21 is closed, because no hydrogen is required by the fuel cell or other hydrogen consumer, hydrogen builds up in housing 12, raising pressure $P_1$ inside reaction chamber 28.

Reactor buoy 36 is open when pressure $P_1$ inside housing 12 is less than or equal to pressure $P_{ref}$ inside elastomeric chamber 38. As the fuel mixture reacts in the presence of catalyst 48, pressure $P_1$ in reaction chamber 28 changes based on the relative hydrogen generation and transport rates. If hydrogen is transported out of housing 12 faster than it is generated, pressure $P_1$ will fall. If the hydrogen is generated faster than it is transported, pressure $P_1$ will rise. Likewise, if valve 21 is closed, pressure $P_1$ will rise. As pressure $P_1$ in reaction chamber 28 rises, elastomeric chamber 38 contracts, because of the pressure differential between the inside and outside of elastomeric chamber 38. As elastomeric chamber 38 contracts, first end cap 40 and cup 42 come together, and seal catalyst 48 away from the fuel mixture. When pressure $P_1$ rises past pressure $P_{ref}$ inside elastomeric chamber 38, reactor buoy 36 closes. Reactor buoy 36 is closed when pressure $P_1$ inside reaction chamber 28 is greater than pressure $P_{ref}$ inside elastomeric chamber 38, sealing catalyst 48 inside reactor buoy 36 away from the fuel mixture. Some fuel mixture may be trapped in within cup 42. The trapped fuel mixture continues to react until exhausted. The hydrogen generated by the reaction of the trapped fuel mixture causes a pressure gradient to form across the seal between cup 42 and cap 40. Some of the produced gas may percolate out under the elastomer, i.e., burp, and the pressure gradient ensures that no additional fuel mixture enters the cup. Additionally, as hydrogen is produced, it will form gas pockets against catalyst 48, isolating catalyst 48 from the fuel mixture. Preferably, the balance between durometer and pressure relief of elastomeric chamber 38 and cap 40 is achieved to ensure that catalyst 48 can be effectively sealed and buoy 36 does not become over-pressurized, which could damage buoy 36.

Preferably, reactor buoy 36 is sized and dimensioned to retain no or substantially no residual aqueous fuel when reactor buoy 36 is closed. Additionally, reactor buoy can be designed to twist and seal when sealing, such that the twisting action ensures that the surface of the catalyst stays clean. If valve 21 is closed, excess pressure is consumed by PEM/hydrogen consumer 24 and pressure $P_1$ stabilizes. If valve 21 is open, pressure $P_1$ begins to fall as hydrogen is transported out of housing 12 and no new hydrogen is produced. When valve 21 is open because the fuel cell or other hydrogen consumer requires hydrogen, pressure $P_1$ in reaction chamber 28 decreases, and elastomeric chamber 38 expands. When pressure $P_1$ falls past pressure $P_{ref}$ inside elastomeric chamber 38, first end cap 40 unseals from cup 42 and reactor buoy 36 re-opens, allowing the fuel mixture to contact catalyst 48, such that the fuel mixture resumes reacting to produce hydrogen. The cycle can now repeat, with pressure $P_1$ rising or falling depending on the generation and transport rates of hydrogen. The pressurization and depressurization of reaction chamber 28 due to fluctuating hydrogen demand thus acts as an automatic feedback system to regulate the production of hydrogen to only when hydrogen is required by the fuel cell or other hydrogen consumer. This feedback system operates by means of the pressure differential across elastomeric chamber 38, and is further described below with reference to Table 1.

TABLE 1

Pressure Cycle in Hydrogen Generating Apparatus

| Pressure Relationships | Position of Valve 21 | Position of Reactor Bouy 36 | Effect on Pressure $P_1$ |
|---|---|---|---|
| $P_1 \leq P_{ref}$ | Closed | Open | Pressure $P_1$ increases as reaction proceeds and hydrogen is generated. |
| $P_1 > P_{ref}$ | Closed | Closed | Pressure $P_1$ is constant. |
| $P_1 > P_{ref}$ | Open | Closed | Pressure $P_1$ decreases as hydrogen is transported through outlet 20. |
| $P_1 \leq P_{ref}$ | Open | Open | Pressure $P_1$ may increase, decrease, c or stay onstant depending on rates of generation and transport. |

Advantageously, the opening and closing of reactor buoy 36 is gradual as $P_1$ increases or decreases. This gradual opening and closing of reactor buoy 36 controls access to catalyst 48, which can control the production gradually to meet the demand for hydrogen.

In an alternative embodiment, one or more elastomeric chambers 38 are closed off from tether 46, and are inflated to a reference pressure. This reference pressure may be chosen to more precisely set the hydrogen pressure in apparatus 10 that will close off catalyst 48 from the fuel mixture to stop the hydrogen production reaction. The buoyancy of the free buoys is matched to the density of the aqueous fuel and byproduct to suspend the free buoys in reaction chamber 28. In an alternative embodiment, tether 46 can be inflexible, or it may be omitted entirely. When tether 46 is omitted, reactor buoy 36 floats freely within reaction chamber 28. In embodiments where tether 46 is either flexible or omitted, the movement of reactor buoy 36 may aid in mixing the fuel mixture.

Changing temperature within hydrogen-generating apparatus 10 may affect $P_1$ and $P_{ref}$, as described by the Ideal Gas Law. However, since the temperature is measured on the absolute scale (Kelvin°) the effect of changing temperature is minor. Furthermore, when chamber 38 is sealed, e.g. when tether 46 is omitted, the changes in $P_1$ and $P_{ref}$ caused by changing temperature tend to negate each other.

In other alternative embodiments, there may be two or more reactor buoys 36, each having first and second end caps 40 and 44, a cup 42 containing catalyst 48, and an elastomeric chamber 38. Each reactor buoy may be connected to a vent 26 via a tether 46, or may have a reference pressure inside a sealed elastomeric chamber 38. Different reactor buoys 36 may have different reference pressures within their elastomeric chambers 38, allowing different reactor buoys to close off their catalysts 48 at different hydrogen pressures $P_1$ in housing 12. Allowing reactor buoys 36 to close at different pressures would allow the hydrogen production rates to be even more finely tuned across a broader range of hydrogen pressures and/or hydrogen demands. One or more reactor buoys could also be temperature sensitive, to allow a more reactive catalyst to be exposed to the fuel mixture in cold weather, and vice versa. When multiple reactor buoys 36 are used, and the reference pressures of reactor buoys 36 are staggered, the pressure cycle which regulates the changes in pressure $P_1$ inside housing 12 is more complex. $P_{ref1}$ is the reference pressure of the first reactor buoy and $P_{ref2}$ is the reference pressure of the second reactor buoy and $P_{ref2}$ is greater than $P_{ref1}$. Table 2 describes this pressure cycle.

When pressure $P_1$ reaches $P_{ref2}$, second reactor buoy 36 closes, sealing catalyst 48 in second reactor buoy 36 away from the fuel mixture, and ceasing the production of hydrogen. Pressure $P_1$ then either drops due to transport, or stays constant until valve 21 is opened after which it drops due to transport. In either case, when pressure $P_1$ falls below $P_{ref2}$, second reactor buoy 36 re-opens, and hydrogen production resumes. If pressure $P_1$ later falls below $P_{ref1}$, because hydrogen is being transported faster than it is being produced by the reaction of the fuel mixture upon contact with catalyst 48 in second reactor buoy 36, first reactor buoy 36 opens, allowing the fuel mixture to contact catalyst 48 in first reactor buoy 36, and increasing the hydrogen generation rate.

This type of system is preferred to keep the pressure of the hydrogen very close to $P_{ref2}$, or when the system is used with an exit pressure control valve, to ensure that the system quickly responds by boosting hydrogen production rates when pressure $P_1$ inside housing 12 falls below $P_{ref1}$, such that if valve 21 does stop the flow of hydrogen to a fuel cell, the stoppage is as short as possible. More than two reactor buoys 36 can be used.

TABLE 2

Pressure Cycle in Hydrogen-Generating Apparatus

| Pressure Relationships | Position of Valve 20 | Position of First Bouy 36 | Position of Second Bouy 36 | Effect on Pressure $P_1$ |
|---|---|---|---|---|
| $P_1 \le P_{ref1}$<br>$P_1 \le P_{ref2}$ | Closed | Open | Open | Pressure $P_1$ increases as reaction proceeds and hydrogen is generated. |
| $P_1 > P_{ref1}$<br>$P_1 \le P_{ref2}$ | Closed | Closed | Open | Pressure $P_1$ increases as reaction proceeds, though more slowly than when $P_1 \le P_{ref1}$. |
| $P_1 > P_{ref1}$<br>$P_1 > P_{ref2}$ | Closed | Closed | Closed | Pressure $P_1$ is constant. |
| $P_1 > P_{ref1}$<br>$P_1 > P_{ref2}$ | Open | Closed | Closed | Pressure $P_1$ decreases as hydrogen is transported through outlet 20. |
| $P_1 > P_{ref1}$<br>$P_1 \le P_{ref2}$ | Open | Closed | Open | Pressure $P_1$ may increase, decrease, or stay constant depending on rates of generation and transport. |
| $P_1 \le P_{ref1}$<br>$P_1 \le P_{ref2}$ | Open | Open | Open | Pressure $P_1$ may increase, decrease, or stay constant depending on rates of generation and transport. Pressure is more likely increase to than when $P_1 > P_{ref1}$. |

In a multi-reactor buoy embodiment, pressure $P_1$ is initially below pressures $P_{ref1}$ and $P_{ref2}$. This causes both reactor buoys 36 to be open. When liquid fuel 50 is transported in reaction chamber 28, and dissolves solid fuel component 34, the resulting fuel mixture will contact catalyst 48 in both reactor buoys 36 causing hydrogen to be produced at a relatively high rate. If the rate of production is higher than the rate of transport to the fuel cell, then pressure $P_1$ in reaction chamber 28 rises. Alternatively, if valve 21 is closed, pressure $P_1$ will rise. When pressure $P_1$ passes $P_{ref1}$, first reactor buoy 36 will close, closing catalyst 48 in first reactor buoy 36 away from the fuel mixture. As a result, the rate of hydrogen production slows. If the rate of transport exceeds the rate of production, pressure $P_1$ will drop, at least until pressure $P_1$ falls below $P_{ref1}$, causing first reactor buoy 36 to re-open. If the rate of hydrogen production still exceeds the rate of transport to the fuel cell, or if valve 21 is closed, $P_1$ continues to rise, until it reaches $P_{ref2}$.

Figure 1B:
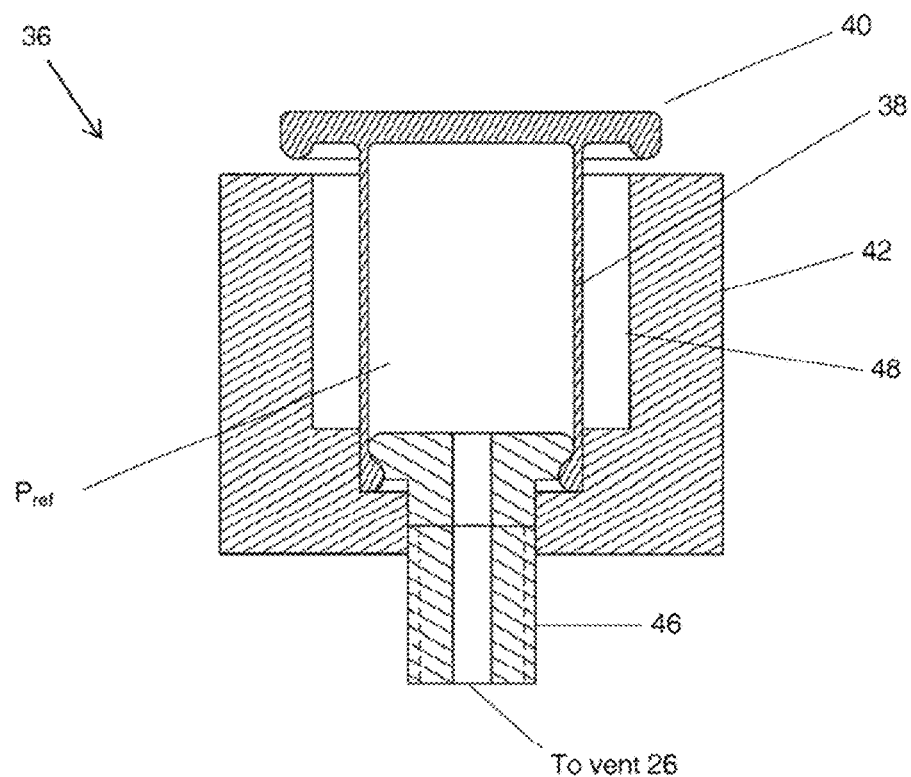

In another embodiment, two reactor buoys 36 have different catalysts 40 and/or different amounts of catalyst 48. When open, one reactor buoy 36 will cause greater hydrogen production rates than the other reactor buoy 36 due to the differences in catalysts 40. This could be advantageous when a very fast catalyst is used to quickly raise pressure $P_1$ in housing 12 and to quickly raise the temperature of the cartridge, because the hydrogen production reaction is exothermic, and a slow catalyst is used to raise pressure $P_1$ to a slightly higher pressure, to fine tune pressure $P_1$. This could reduce pressure oscillations caused by a very active catalyst being continually exposed to and sealed away from a reaction mixture in times of low hydrogen demand, while still maintaining the ability of apparatus 10 to cope with times of high hydrogen demand with slightly lower pressures. Furthermore, multiple buoys with different catalysts can also be deployed to meet any hydrogen demands Another embodiment of reactor buoy 36 is illustrated in FIG. 1B. Reactor buoy 36 in this embodiment comprises a cup 42 and a cap 40. Elastomeric chamber 38 is disposed partially within cup 42 and is connected to cap 40. The inside of elastomeric chamber 38 is connected to a reference pressure vent 26 via tether 46. Catalyst 48 is disposed on the inner walls of cup 42 or on chamber 38 or cap 40.

When pressure $P_1$ is greater than reference pressure $P_{ref}$, the walls of elastomeric chamber 38 will be deformed inward, pulling cap 40 down onto cup 42. When pressure $P_1$ falls below $P_{ref}$, the increased pressuring inside elastomeric chamber 38 will push cap 40 off of cup 42. Furthermore, as generally shown in FIGS. 1B-1E, when elastomeric chamber 38 contracts or collapses, its side wall can abut cup 42 or abut itself, therefore limiting the amount of contraction. This contraction limit can extend the operational life of elastomeric chamber 38.

This embodiment of reactor buoy 36 will exhibit the same "burping" effect as the prior embodiment, wherein fuel mixture trapped inside cup 42 when cap 40 closes continues to react, raising the pressure inside cup 42 around elastomeric chamber 38, and creating a pressure gradient across the interface between cup 42 and cap 40. This pressure gradient will allow reactor buoy 36 to "burp" or open momentarily to release produced gas, but will keep additional fuel mixture from entering cup 42. The build-up of gas inside cup 42, especially in the form of bubbles on the surface of catalyst 48, will also act as an additional seal on catalyst 48. As the trapped liquid fuel inside cup 42 reacts, it will be exhausted, stopping the hydrogen production reaction until reactor buoy 36 reopens.

Yet another embodiment of reactor buoy 36 is illustrated in FIG. 1C. This embodiment is similar to the embodiment in FIG. 1B except that, in this embodiment, catalyst 48 is attached to cap 40. Additionally, the space that can contain fuel when the buoy is in the closed position is smaller in this embodiment due to the ledge 49 positioned proximate to catalyst 48. Ledge 49 seals off a portion of space inside cup 42, when buoy 36 closes. This embodiment will otherwise perform similarly to the embodiment in FIG. 1B, and will exhibit a similar response to increasing pressure in the fuel mixture, where the walls of elastomeric chamber 38 will deform to pull cap 40 down onto cup 42 to seal away catalyst 48, and will exhibit a similar "burping" effect to allow trapped gas next to catalyst 48 to escape closed reactor buoy 36 while not allowing new fuel mixture into buoy 36.

Figure 1F:
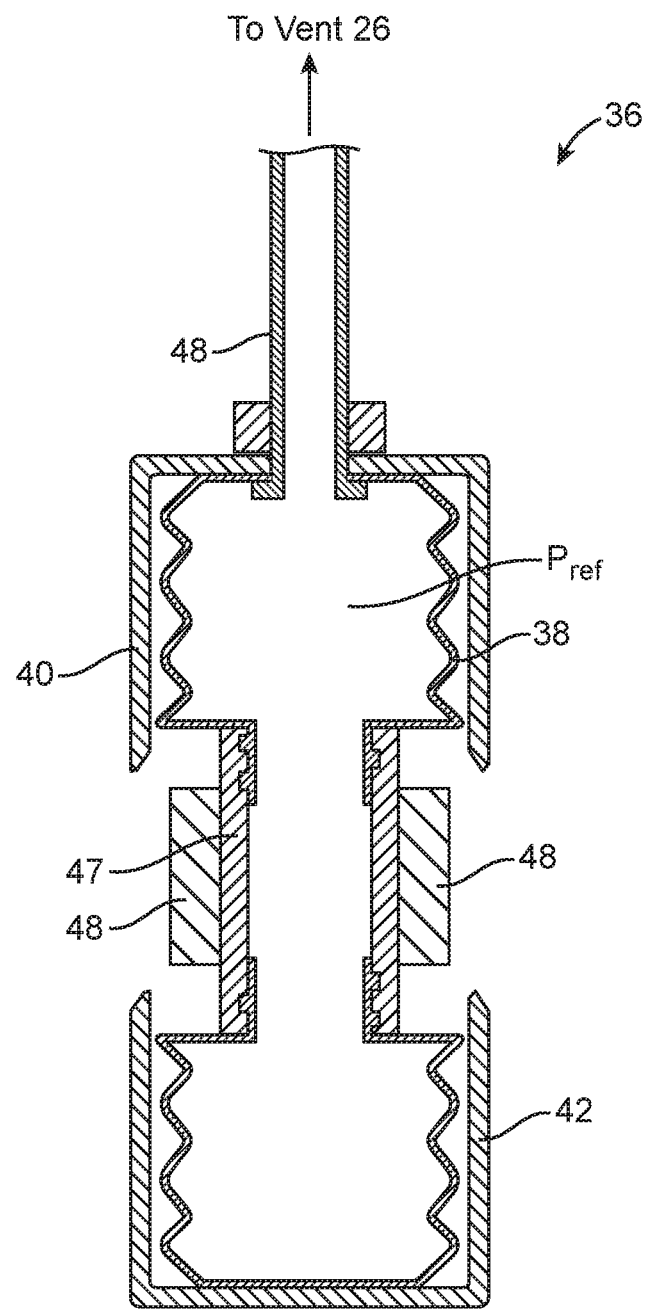
FIG. 1F illustrates a cross-section of yet another embodiment of a reactor buoy of the present invention.
Figure 1G:
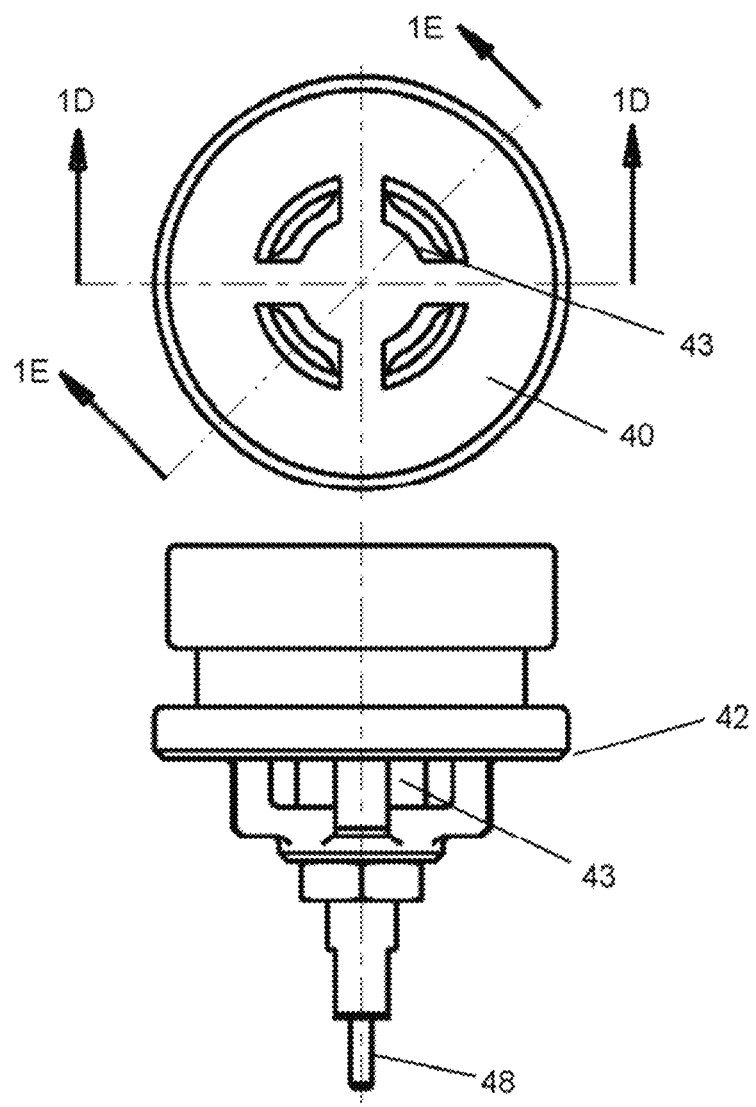
FIG. 1G is a perspective view of the embodiment shown in FIGS. 1D and 1E.

FIGS. 1D and 1E illustrate several cross-sectional views of another embodiment of reactor buoy 36, shown as a perspective view of FIG. 1G. This embodiment is similar to the embodiments described with reference to FIGS. 1B and 1C, except in this embodiment cap 40 additionally comprises a catalyst space 41 and catalyst 48 is disposed on cup 42 in an upstanding ring shape, such that when reactor buoy 36 closes, cup 40 seals over catalyst 48, trapping catalyst 48 in catalyst space 41 and ensuring that no new fuel mixture passes into catalyst space 41. Catalyst space 41 is small, so that only a small amount of liquid fuel is trapped in catalyst space 41 when reactor buoy 36 closes. Because less fuel is retained in reactor buoy 36 adjacent catalyst 48 when reactor buoy 36 closes, this embodiment can shut down the hydrogen production reaction faster than embodiments with more space for fuel mixture adjacent catalyst 48. The upstanding ring shape of catalyst 48 also allows the reactor buoy to react faster, because fuel mixture can reach catalyst 48 on both sides, and hydrogen can flow away from catalyst 48 on both sides, less catalyst is required and reactor buoy 36 can respond more quickly.

Cap 40 and cup 42 also comprise fuel channels 43, best seen in FIGS. 1E and 1G. Fuel channels 43 allow fuel mixture outside reactor buoy 36 to contact elastomeric chamber 38 even when reactor buoy 36 is closed. This has several effects. First, it minimizes the effect of the high pressure zone around catalyst 48 on elastomeric chamber 38, ensuring that reactor buoy 36 opens quickly when pressure $P_1$ falls below pressure $P_{ref}$. Second, it improves access by the fuel mixture to catalyst 48 by minimizing the effect of bubbles which might otherwise impede the flow of fuel to catalyst 48 during the opening of reactor buoy 36 by ensuring that there are multiple directions from which fuel can access catalyst 48.

Other than the changes discussed, this embodiment of reactor buoy 36 will operate similarly to the previously described embodiments. It will exhibit a similar response to increasing pressure, where the walls of elastomeric chamber 38 will deform inward, pulling cap 40 down onto cup 42, and will exhibit a similar "burping" effect, where fuel mixture trapped in catalyst space 41 will react, raising the pressure in space 41, forcing cap 40 off of cup 42 momentarily to allow some produced hydrogen gas to escape catalyst space 41 without allowing new fuel mixture to enter space 41.

In each of the above embodiments, the pressure required to close reactor buoy 36 can be varied by adding springs, for example within elastomeric chamber 38, changing the elastomer's durometer, thickness, or profile, or by changing the reference pressure. Additionally, the motion of cap 40 can be modified to a twisting motion to close reactor buoy 36 by varying the profile of elastomeric chamber 38, such as by including spiral ribs on the walls of the chamber. Chamber 38 can also be made from flexible but non-elastomeric material, particularly when spring(s) are used within chamber 38.

In yet another embodiment of reactor buoy 36, seen in FIG. 1F, reactor buoy 36 comprises an upper cup 40 and a lower cap 42, wherein upper cup 40 and lower cap 42 enclose elastomeric chamber 38. Preferably, one lip of either cup 40 or cap 42 is flexible or elastomeric to ensure a good seal when closed. Elastomeric chamber 38 in this embodiment comprises a two-part corrugated bellows which compresses when $P_1$ exceeds $P_{ref}$. Alternatively, either the top or the bottom corrugated portion alone is necessary. Catalyst support 47 connects the first and second parts of the corrugated bladder, and also supports catalyst 48. During operation, as the pressure outside elastomeric chamber 38 rises, cup 40 and cap 42 are pulled together by the compression of elastomeric chamber 38, and edges of cap 40 seal over edges of cap 42 to seal catalyst 48 inside caps 40 and 42. The elastomeric character of the lip of cup 40 or cap 42 facilitates the burping effect discussed previously. In other respects it operates similarly to the previously described embodiments.

In alternative embodiments of reactor buoy 36, the catalyst may be sealed away using diaphragms, cylinders, bellows or other constructions instead of the elastomeric chamber shown.

In yet other embodiments, catalyst 48 can be molded into a portion of the elastomer.

FIG. 2A illustrates another embodiment of inventive hydrogen-generating apparatus 10. In this embodiment, hydrogen-generating apparatus 10 comprises a housing 56, which in turn comprises a reaction chamber 58 and a piston chamber 60 separated by a barrier 62 from reaction chamber 58. A spring 64 pushes a piston 68. A sealing O-ring 98 disposed in piston 68 isolates the pressure from piston chamber 60 from spring 64 so that the spring force from spring 64 counterbalances the pressure in piston chamber 60. Preferably, the compartment that houses spring 64 is vented so that no trapped air is compressed and no partial vacuum develops when spring 64 is compressed or extended, respectively. Piston 68 is connected to a shaft 70 that passes through barrier 62. Shaft 70 can pass into and out of reaction chamber 58. An O-ring 74 seals the interface between shaft 70 and barrier 62 such that material from reaction chamber 58 cannot escape along shaft 70. Reactor 72 comprises a cup 76, which is fixedly connected to shaft 70, and elastomeric sealing member 82, which is fixedly connected to barrier 62. An elastomeric plug 78 is optionally disposed within cup 76. A bottom portion of shaft 70 adjacent elastomeric plug 78 is covered with catalyst 48. Elastomeric sealing member 82 forms a seal with elastomeric plug 78 in cup 76 when piston 70 pulls cup 76 upward, as shown.

At least part of reaction chamber 58 comprises a hydrogen permeable liquid-impermeable membrane 84. Membrane 84, similar to membranes 27 and 32, serves to keep liquid reactants and reaction byproducts inside reaction chamber 58. An outer screen 86 is disposed between hydrogen permeable membrane 84 and housing 56 to prevent membrane 84 from contacting housing 56 and sealing to housing 56, which can prevent hydrogen from leaving reaction chamber 58 and thereby building pressure in reaction chamber 58. This pressure build-up may prematurely shut down the system. An inner screen 88 may be disposed adjacent to the internal surface of hydrogen permeable membrane 84 to prevent membrane 84 from sealing to itself. A fuel mixture 100 is injected into reaction chamber 58 through port 102 on barrier 62. Fuel mixture 100 is preferably a solution of a liquid fuel and a solid fuel component, and is more preferably a stabilized metal hydride solution, most preferably an aqueous solution of sodium borohydride stabilized by sodium hydroxide, discussed above.

Housing 56 comprises at one end an outlet valve 90 covered by an absorbent foam 92, and at the other end a hydrogen feedback conduit 94 to allow hydrogen to bypass barrier 62 into piston chamber 60. Valve 90 is connectable to a fuel cell and can be controllable by the fuel cell to regulate the flow of hydrogen to the fuel cell based on the fuel cell's hydrogen requirements. Foam 92 is preferably absorbent to retain any liquids or reaction by-products to hydrogen generating apparatus 10.

When hydrogen generating apparatus 10 is to be put into operation, reaction chamber 58 is filled with fuel mixture 100 through fill port 102. Fuel mixture 100 reacts in presence of catalyst 48 to produce hydrogen. Hydrogen diffuses through hydrogen permeable membrane 84. Hydrogen passes out of hydrogen-generating apparatus 10 through valve 90 to be used by a fuel cell or other hydrogen consumer. Hydrogen also moves through feedback conduit 94 into piston chamber 60. If valve 90 is closed, because the fuel cell or hydrogen consumer does not require fuel, hydrogen begins to build up inside reaction chamber 58. This pressure, which is the same as the pressure in reaction chamber 58, acts on piston 68. As the pressure in chamber 60 builds, it pushes against piston 68 opposing spring 64, and forces piston 68 away from barrier 62. As piston 68 is forced away from barrier 62, it pulls cup 76 toward elastomeric sealing member 82. When cup 76 abuts elastomeric sealing member 82, elastomeric sealing member 82 creates a seal with elastomeric plug 78, which prevents fuel mixture 100 from contacting catalyst 48. This halts the reaction of fuel mixture 100, subject to the possible "burping" effect described previously, and hydrogen production ceases. Pressure $P_2$ of reaction chamber 58 stabilizes with catalyst 48 sealed away from fuel mixture 100 until valve 90 is opened.

When valve 90 is opened, hydrogen begins to flow to the fuel cell. As hydrogen flows out of reaction chamber 58, pressure $P_2$ in reaction chamber 58 and the pressure in chamber 60 decreases. Spring 64 then pushes piston 68 toward barrier 62, which in turn forces cup 76 off of elastomeric sealing member 82, allowing fuel mixture 100 to again contact catalyst 48, where it reacts to produce hydrogen, beginning the cyclical process again.

At any given time in the hydrogen-generating apparatus 10, force $K_1$ of spring 64 acting on piston 68 balances pressure P2 of reaction chamber 58 acting on piston 64, as seen below.

$$K_1 = \text{Force } F_2 \text{ caused by } P_2 \text{ (i.e. } P_2*\text{surface area of piston 68).} \quad (1)$$

$K_1$ is a spring force, governed by the general formula $K=k*\Delta x$, where k is the spring constant of the spring and $\Delta x$ is the displacement from an uncompressed length of the spring. For spring 64, this formula becomes $K_1=k_1*\Delta x_1$. As spring 64 is compressed, $\Delta x_1$ increases, and therefore force $K_1$ increases. As $P_2$ increases, it pushes on spring 64 and piston 68 is moved away from barrier 62 to close reactor 72. When pressure $P_2$ falls, spring 64 will push piston 68 toward barrier 62 to open reactor 72. When pressure $P_2$ rises sufficiently that piston 68 is pushed away from barrier 62 so far that cup 76 abuts sealing member 82, optional stop 77 abuts piston 68 to avoid over-pressurization of catalyst 48, such that even when pressure $P_2$ increases, piston 68 cannot move further upward, as shown. Preferably, at or about this elevated pressure, the excess pressure is vented through valve 22 and hydrogen consumer 24.

When reactor 72 is open, cup 76 is not in contact with sealing member 82, and thus fuel mixture 100 may contact catalyst 48, and react to produce hydrogen. If the hydrogen generation rate exceeds the rate at which hydrogen is transported to the fuel cell, or valve 90 is closed, pressure $P_2$ in reaction chamber 58 will rise. If the rate at which hydrogen is transported to the fuel cell exceeds the hydrogen generation rate, pressure $P_2$ will fall. Table 3 summarizes the pressure cycle for this embodiment.

TABLE 3

Pressure Cycle of Hydrogen Generating Apparatus

| Pressure Relationships | Position of Valve 90 | Position of Reactor 72 | Effect on Pressure $P_2$ |
|---|---|---|---|
| $K_1 = F_2$ | Closed | Open | Pressure $P_2$ increases as reaction proceeds and hydrogen is generated. |
| $K_1 < F_2$ | Closed | Closed | Pressure $P_2$ is constant. |
| $K_1 < F_2$ | Open | Closed | Pressure $P_2$ decreases as hydrogen is transported through valve 90. |
| $K_1 = F_2$ | Open | Open | Pressure $P_2$ may increase, decrease, or stay constant depending on rates of generation and transport. |

Figure 2B:
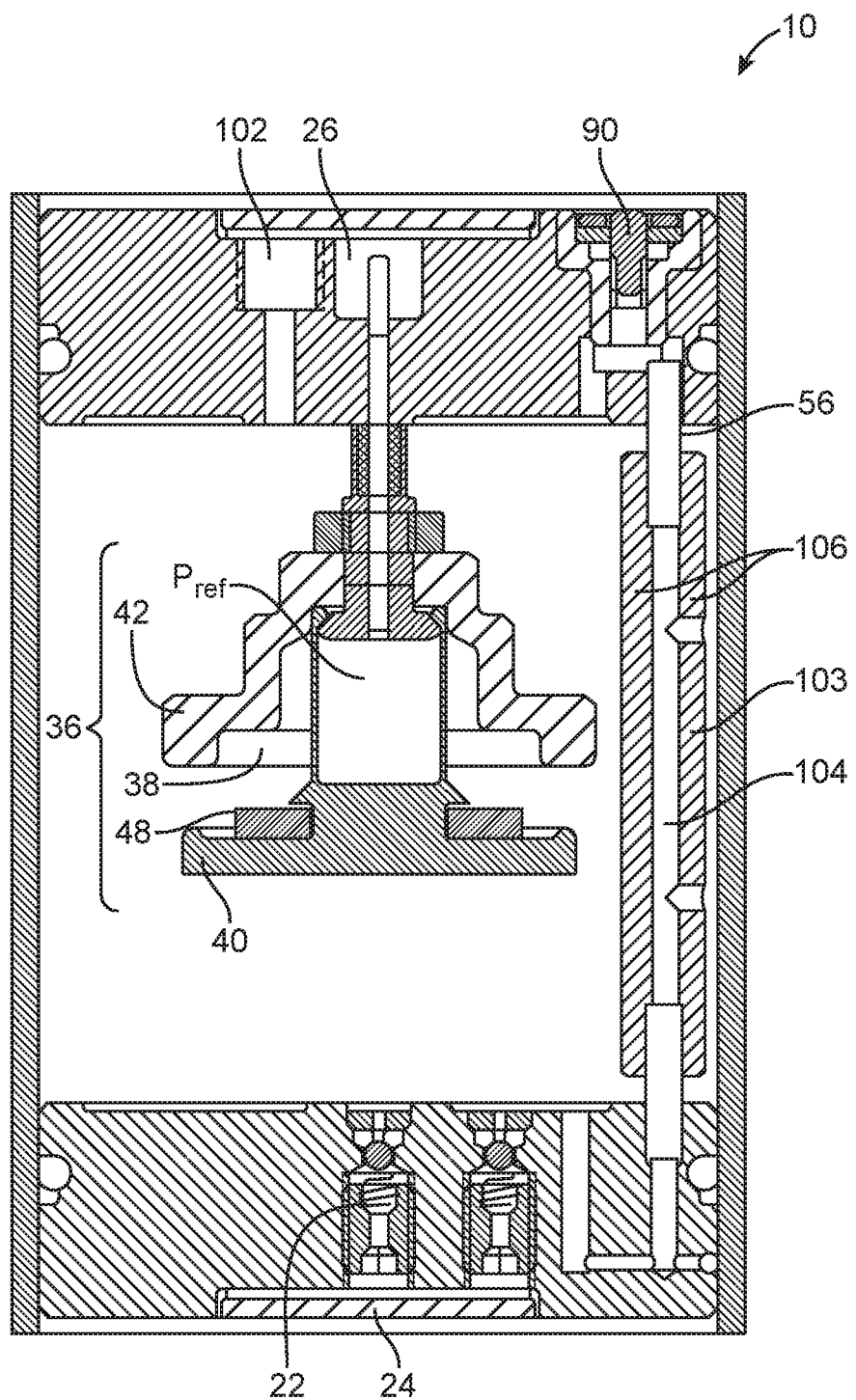

Another embodiment of hydrogen-generating apparatus 10 is illustrated in FIG. 2B. This embodiment of hydrogen-generating apparatus 10 is similar to the embodiment described with reference to FIG. 2A, except that this embodiment replaces the piston and shaft system of the previous embodiment with reactor buoy 36 described with reference to FIG. 1C or with the buoy described with reference to FIGS. 1D, 1E, and 1G. This embodiment also does not include membrane 84 or screens 86 or 88, or foam 92 to filter gas out of the fuel mixture, and instead comprises a hydrogen output laminate 103. Hydrogen output laminate 103 is attached to valve 90 and comprises three or more laminate layers. The outermost layers comprise membranes 106 permeable to a gas such as hydrogen but impermeable to liquid, and the inner layer comprises a lattice-like material 104 as a support structure to allow gas flow through the membranes 106 to valve 90. Lattice-like material 104 may be a solid lattice, a fabric, textile, nylon knit, wick, mesh material, or other gas permeable structure that can serve as a base for lamination. Laminate 103 serves to filter produced hydrogen gas out of the fuel mixture and convey the produced gas to valve 90. By constructing this liquid separator in this manner, instead of using a membrane enclosing a fuel mixture, higher pressures can be used within the housing, because laminate 103 is under compression while the membrane, such as membrane/screens 86/84/88 would be under expansion. Laminate 103 has the ability to withstand more compression than the membrane could withstand expansion.

Lattice-like material 104 may be stiff or flexible. Alternatively, laminate 103 may be replaced by a lattice-like or fabric material with a hydrogen permeable membrane to either side. Laminate 103 may also comprise a pair of screens on the sides of membranes 106 opposite lattice-like material 104.

Figure 2D:
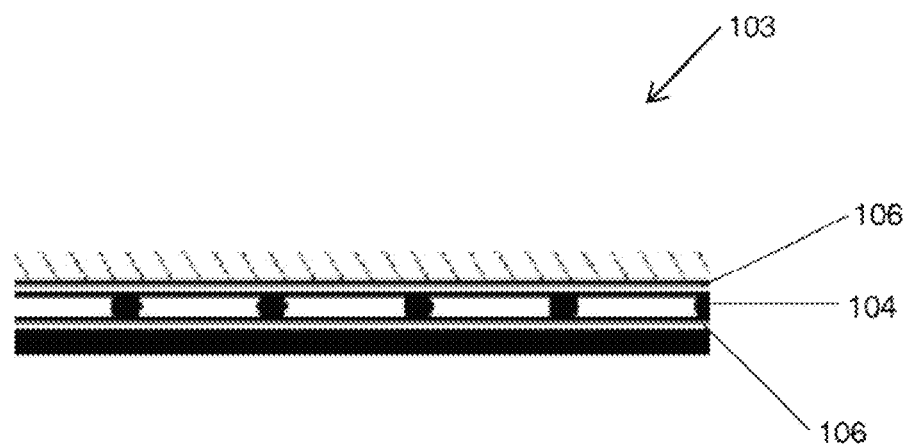
FIG. 2D illustrates a cross sectional view of a laminate of the present invention.

Hydrogen generating apparatus 10, as seen in FIG. 2C, is similar to the embodiment described in FIG. 2B. This embodiment differs from the embodiment in FIG. 2B in that gas-impermeable tube 108 is disposed where laminate 103 had been. Laminate 103 is now disposed to cover the two ends of reaction chamber 58 and around the periphery of reaction chamber 58, where it fits between housing 56 and tube 108. In this embodiment, the membranes 106 of laminate 103 completely surround lattice-like material 104 to ensure that only material diffusing through membranes 106 can reach lattice-like material 104. A cross-sectional view of laminate 103 is illustrated in FIG. 2D. Produced hydrogen gas filters into laminate 103 from reaction chamber 58, and then filters out of laminate 103 into tube 108, where laminate 103 is pressed between tube 108 and housing 56. This embodiment also includes two relief valves 22a and 22b. Relief valve 22a relieves hydrogen pressure for the gas side of membrane 84, whereas relief valve 22b is an additional valve to relieve internal cartridge pressure if produced gas cannot relieve fast enough through relief valve 22a or if membrane 84 becomes clogged. Fill port 103 in this embodiment includes a septum 110 and a hollow hexagonal setscrew 112. Septum 110 and hollow hexagonal setscrew 112 allow gas-generating apparatus 10 to be easily filled and resealed afterwards.

Another embodiment of hydrogen-generating apparatus 10 is shown in FIGS. 2E-2G. This embodiment is similar to the embodiment described with reference to FIG. 2C except that laminate 103 forms one wall of reaction chamber 58. A hydrogen conduit 114 connects laminate 103 to an outlet. A cartridge pressure conduit 116 provides another conduit between the side of laminate 103 opposite reaction chamber 58 and the outlet. In FIG. 2E, tether 46 and cartridge pressure conduit 116 are behind hydrogen conduit 114. FIG. 2G provides a detail view of the section of this embodiment including reactor buoy 36 and laminate 103. This embodiment was used to test reactor buoy 36, as discussed later.

Another embodiment of hydrogen generating apparatus 10 is illustrated in FIG. 3. This embodiment of hydrogen generating apparatus 10 differs from the embodiment described with reference to FIG. 2A primarily in that an elastomeric ball 142 is exchanged for cup 76 and elastomeric plug 78, and that shaft 70 is decoupled and is biased by a second spring 126.

Also shown in the embodiment of FIG. 3, but is unusable with other embodiments of the present invention, is that shaft 70 is decoupled into lower shaft 70a and upper shaft 70b. Upper shaft 70b is biased by spring 64 and piston 68 is balanced between spring force $K_1$ from spring 64 and force $F_2$ from the pressure in piston chamber 60, discussed above. Lower shaft 70a is biased by a second spring 126, which preferably has a spring constant lower than that of spring 64. The purpose of having a weaker spring biasing the portion of the shaft that is directly connected to reactor 72 is to lower the forces, particularly the closing force, acting on reactor 72 and also to allow for "burping" of excess hydrogen during sealing without continued hydrogen generation. Higher closing forces e.g. when $F_2 >> K_1$, may cause elastomeric ball 142 or cup 76 to become disconnected from shaft 70, 70a. By decoupling shaft 70 and using a second spring 126 to open and close reactor 72, second spring 126 can be sized and dimensioned for reactor 72 and spring 64 can be sized and dimensioned to balance $F_2$ to match the hydrogen demand and production.

In one example, if spring 64 is moved by a known amount $\Delta x$, the amount of force applied by spring 64 is $k_1 * \Delta x$. Since spring 126 is also moved by the same amount $\Delta x$, the amount of force applied by spring 126 is $k_{126} * \Delta x$. If spring 126 has a lower spring constant than spring 64, then the force exerted by spring 126 is lower that the force exerted by spring 64. Alternatively, the spring constant of spring 126 can be greater than $k_1$ if the reactor needs a greater closing force.

In this embodiment, catalyst 48 is disposed on shaft 70 near elastomeric ball 142. Reactor 72 comprises ball 142, shaft casing 136 disposed about shaft 70, including shaft sealing surface 138, and catalyst 48. When $P_2$ is high, ball 142 is pulled against sealing surface 138, reactor 72 is closed and catalyst 48 is sealed away from fuel mixture 100 by ball 142 and sealing surface 138 of shaft casing 136. When $P_2$ is low, ball 142 is pushed off of sealing surface 138, reactor 72 is open and catalyst 48 is exposed to fuel mixture 100.

FIG. 4 illustrates a barrier 62 for use with embodiment of the present invention such as the embodiment described with reference to FIGS. 2A 3. Barrier 62 has a generally cylindrical shape, and has one or more feedback conduits 128 therethrough spaced about its periphery to allow pressure to equalize on either side of barrier 62. Barrier 62 defines a bore 152 therethrough, through which shaft 70 may pass. Barrier 62 may optionally have a sealing ring space to allow a sealing ring to be held therein, such that such a sealing ring would seal about a shaft passed through bore 152 to ensure fluid did not travel through bore 152.

FIG. 5 illustrates an alternate embodiment of an elastomeric ball similar to ball 142 for use with embodiments of the present invention such as the embodiment described with reference to FIG. 3. Ball 156 has a circular seal member 158 circumventing its equator, and one or more sections of catalyst 160 are arrayed on one of the hemispheres of ball 156 defined by seal member 158. Ball 156 is attached to shaft 70 via a tether 162 or other connecting member on the same hemisphere of ball 156 as the sections of catalyst 160, such that when shaft 70 moves further into piston chamber 60, tether 162 pulls ball 156 toward shaft casing 136. Shaft casing 136 has a bore larger than that of shaft casing 136 described with reference to FIG. 3, such that when ball 156 is pulled toward shaft casing 136, ball 156 can pass partially into shaft casing 156 instead of sealing on sealing face 138 thereof. Seal member 158 of ball 156 forms a seal with the walls of the bore of shaft casing 136, and catalyst 48 is thereby sealed inside shaft casing 136 away from fuel mixture 100. In all other respects, this embodiment of an elastomeric ball 156 and associated hydrogen generating apparatus 10 functions identically to hydrogen-generating apparatus 10 described with reference to FIG. 3.

In each of the above described embodiments, the reactor may adjust to varying concentrations of fuel, temperature variations, and pressures. With respect to fuel concentrations, a high fuel concentration may cause hydrogen to be generated faster, which may cause the reactor to close quickly. As pressure lowers, a small opening in the reactor may generate enough hydrogen to increase the pressure in the reaction chamber and close the reactor. A low fuel concentration may cause hydrogen to be generated more slowly. The reactor will open wider than it would with higher concentrations of fuel. The extra fuel flowing into the reactor will generate a quantity of hydrogen similar to what was produced at a higher fuel concentration, but using a lower concentration fuel. With respect to temperature variations, higher temperatures may produce hydrogen more rapidly than lower temperatures, causing the reactor to close more quickly. Conversely, lower temperatures may produce hydrogen more slowly, causing the reactor to remain open longer so as to produce a similar amount of hydrogen. With respect to pressures, the reactor may limit the pressure inside the reaction chamber because whenever the pressure surpasses a set value, the reactor may close and cease producing hydrogen. If the fuel mixture is sufficiently stabilized, the pressure will remain at this shut-off pressure.

Some examples of the fuels that are used in the present invention include, but are not limited to, hydrides of elements of Groups IA-IVA of the Periodic Table of the Elements and mixtures thereof, such as alkaline or alkali metal hydrides, or mixtures thereof. However, the hydrogen apparatus 10 described herein can be employed for other type of gas generations. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, calcium hydride, and salts and/or derivatives thereof. The preferred hydrides are sodium borohydride, magnesium borohydride, lithium borohydride, and potassium borohydride. Preferably, the hydrogen-bearing fuel comprises the solid form of $NaBH_4$, $KBH_4$, $Mg(BH_4)_2$, or methanol clathrate compound (MCC) which is a solid and includes methanol, and most preferably it comprises $NaBH_4$. In solid form, $NaBH_4$ does not hydrolyze in the absence of water and therefore improves shelf life of the cartridge. However, the aqueous form of hydrogen-bearing fuel, such as aqueous $NaBH_4$, can also be utilized in the present invention. Whenever the aqueous form of $NaBH_4$ is utilized, either initially, or after the solid fuel component is mixed with the liquid fuel, the chamber containing the aqueous $NaBH_4$ should also include a stabilizer. Exemplary stabilizers can include, but are not limited to, metals and metal hydroxides, such as alkali metal hydroxides. Examples of such stabilizers are described in U.S. Pat. No. 6,683,025, which is incorporated by reference herein in its entirety. Preferably, the stabilizer is NaOH.

According to the present invention, the fluid fuel component preferably is capable of reacting with a hydrogen-bearing solid fuel component in the presence of an optional catalyst to generate hydrogen. Preferably, the fluid fuel component includes, but is not limited to, water, alcohols, and/or dilute acids. The most common source of fluid fuel component is water. As indicated above and in the formulation below, water may react with a hydrogen-bearing fuel, such as $NaBH_4$ in the presence of an optional catalyst to generate hydrogen.

$$X(BH_4)_y + 2H_2O \rightarrow X(BO)_2 + 4H_2$$

Where X includes, but is not limited to, Na, K, Mg, Li and all alkaline metals, and y is an integer. In a preferred embodiment, the metal hydride comprises a mixture of $NaBH_4$ and $KBH_4$, wherein the ratio of $NaBH_4$:$KBH_4$ is preferably about 5:2. This ratio can be as low as 6:4, as shown in the Table above, or 1:1, and can be as high as 5:1. Such a ratio is advantageous, because it promotes the solubility and flowability of both the borohydride fuel and its borate byproducts. More particularly, although solid $NaBH_4$ is very soluble in water, when it participates in the hydride-water oxidation reaction, it forms hydrogen gas as well as a pasty slurry of borate. Conversely, although $KBH_4$ forms a slurry in water, when it participates in the hydride-water oxidation reaction, its aqueous borate byproduct does not form a slurry but is relatively soluble. Thus, given the potential disadvantages of using $NaBH_4$ or $KBH_4$ alone, it has been discovered that the mixture of $NaBH_4$ and $KBH_4$ produces a synergistic combination that yields both soluble borohydride fuel and soluble borate byproducts.

Fluid fuel component also includes optional additives that reduce or increase the pH of the solution. The pH of fluid fuel component can be used to determine the speed at which hydrogen is produced. For example, additives that reduce the pH of fluid fuel component result in a higher rate of hydrogen generation. Such additives include, but are not limited to, acids, such as acetic acid and sulfuric acid. Conversely, additives that raise the pH can lower the reaction rate to the point where almost no hydrogen evolves.

The catalyst of the present invention may include one or more transitional metals from Group VIIIB of the Periodic Table of Elements. For example, the catalyst may include transitional metals such as iron (Fe), cobalt (Co), nickel (Ni), ruthenium (Ru), rhodium (Rh), platinum (Pt), palladium (Pd), osmium (Os) and iridium (Ir). Additionally, transitional metals in Group IB, i.e., copper (Cu), silver (Ag) and gold (Au), and in Group IIB, i.e., zinc (Zn), cadmium (Cd) and mercury (Hg), may also be used in the catalyst of the present invention. The catalyst may also include other transitional metals including, but not limited to, scandium (Sc), titanium (Ti), vanadium (V), chromium (Cr) and manganese (Mn). Transition metal catalysts useful in the present invention are described in U.S. Pat. No. 5,804,329, which is incorporated by reference herein in its entirety. The preferred catalyst of the present invention is $CoCl_2$.

Some of the catalysts of the present invention can generically be defined by the following formula:

$$M_a X_b$$

wherein M is the cation of the transition metal, X is the anion, and "a" and "b" are integers from 1 to 6 as needed to balance the charges of the transition metal complex.

Suitable cations of the transitional metals include, but are not limited to, iron (II) ($Fe^{2+}$) iron (III) ($Fe^{3+}$) cobalt ($Co^{2+}$) nickel (II) ($Ni^{2+}$) nickel (III) ($Ni^{3+}$) ruthenium (III) ($Ru^{3+}$) ruthenium (IV) ($Ru^{4+}$), ruthenium (V) ($Ru^{5+}$), ruthenium (VI) ($Ru^{6+}$), ruthenium (VIII) ($Ru^{8+}$), rhodium (III) ($Rh^{3+}$) rhodium (IV) ($Rh^{4+}$) rhodium (VI) ($Rh^{6+}$) palladium ($Pd^{2+}$) osmium (III) ($Os^{3+}$), osmium (IV) ($Os^{4+}$), osmium (V) ($Os^{5+}$), osmium (VI) ($Os^{6+}$), osmium (VIII) ($Os^{8+}$), iridium (III) ($Ir^{3+}$), iridium (IV) ($Ir^{4+}$), iridium (VI) ($Ir^{6+}$), platinum (II) ($Pt^{2+}$), platinum (III) ($Pt^{3+}$), platinum (IV) ($Pt^{4+}$), platinum (VI) ($Pt^{6+}$), copper (I) (Cu), copper (II) ($Cu^{2+}$), silver (I) (Ag silver (II) ($Ag^{2+}$), gold (I) ($Au^+$), gold (III) ($Au^{3+}$), zinc ($Zn^{2+}$), cadmium ($Cd^{2+}$), mercury (I) (Hg mercury (II) ($Hg^{2+}$), and the like.

Suitable anions include, but are not limited to, hydride ($H^-$), fluoride ($F^-$), chloride ($Cl^-$), bromide ($Br^-$), iodide ($I^-$), oxide ($O^{2-}$), sulfide ($S^{2-}$), nitride ($N^{3-}$), phosphide ($P^{4-}$), hypochlorite ($ClO^-$), chlorite ($ClO_2^-$), chlorate ($ClO_3^-$), perchlorate ($ClO_4^-$), sulfite ($SO_3^{2-}$), sulfate ($SO_4^{2-}$), hydrogen sulfate ($HSO_4^-$), hydroxide ($OH^-$), cyanide ($CN^-$), thiocyanate ($SCN^-$), cyanate ($OCN^-$), peroxide ($O_2^{2-}$), manganate ($MnO_4^{2-}$), permanganate ($MnO_4^-$), dichromate ($Cr_2O_7^{2-}$), carbonate ($CO_3^{2-}$), hydrogen carbonate ($HCO_3^-$), phosphate ($PO_4^{2-}$), hydrogen phosphate ($HPO_4^-$), dihydrogen phosphate ($H_2PO_4^-$), aluminate ($Al_2O_4^{2-}$), arsenate ($AsO_4^{3-}$), nitrate ($NO_3^-$), acetate ($CH_3COO^-$), oxalate ($C_2O_4^{2-}$), and the like. A preferred catalyst is cobalt chloride.

The catalyst may also include a reaction product of one of the above catalysts and aqueous NaBH4, or may be the reduction product of one of the aforementioned catalysts. If the primary catalyst is cobalt chloride, the reaction product may be $Co(BO_2)OH$, or another compound comprising cobalt, boron, and oxygen or may be an alloy of cobalt and boron, such as amorphous cobalt boride (Co—B), especially an alloy of cobalt and boron having a 2:1 or 3:1 atomic ratio of cobalt to boron. Such catalyst compounds are disclosed in U.S. Pat. No. 4,863,888, which is incorporated herein by reference in its entirety. The catalyst can be deposited on any substrate, preferably a porous or foam substrate, such as aerogel or metal foam, such as nickel foam, disclosed in parent provisional application 61/140,313.

In some exemplary embodiments, the optional additive, which is in fluid fuel component and/or in the reaction chamber, is any composition that is capable of substantially preventing the freezing of or reducing the freezing point of fluid fuel component and/or solid fuel component. In some exemplary embodiments, the additive can be an alcohol-based composition, such as an anti-freezing agent. Preferably, the additive of the present invention is $CH_3OH$. However, as stated above, any additive capable of reducing the freezing point of fluid fuel component and/or solid fuel component may be used.

In some exemplary embodiments, the optional additive, which is in fluid fuel component and/or in the reaction chamber, is any composition that is capable of suppressing or preventing the formation of foam or bubbles by hydrogen in the liquid fuel during its production. Polyglycol anti-foam agents offer efficient distribution in aqueous systems and are tolerant of the alkaline pH conditions found in stabilized borohydride solutions. Other antifoam agents may include surfactants, glycols, polyols and other agents known to those having ordinary skill in the art.

The inventors of the present invention also observed that the electrical resistance of aqueous sodium borohydride or aqueous metal hydride increases as the solution reacts to produce hydrogen and aqueous borate byproduct. In other words, the electrical resistance of aqueous borate byproduct is about one order of magnitude higher than the electrical resistance of aqueous metal borate hydride. In one example, the electrical resistance of aqueous sodium borohydride before any reaction was measured to be about 16 ohms ($\Omega$) and the electrical resistance of the aqueous sodium borate and any unreacted fuel was measured to be about 160 ohms ($\Omega$). Hence, the electrical resistance of the aqueous solution can be used as a fuel gage for hydrogen generating apparatus 10. A calibration curve can be readily pre-established, and during use the electrical resistance of the aqueous fuel mixture/byproduct within reaction chamber 28 can be continually measured using, for example, readily available ohmmeters or voltmeters. The electrical resistance accurately reflects the remaining unreacted fuel in reaction chamber 28.

The inventors also observed that the volume of the aqueous fuel mixture/byproduct also decreases as the more fuel mixture is reacted. In one example, the volume decreases by about 25% from start to finish. Additionally, the density of the remaining aqueous fuel mixture/byproduct increases. A visual fuel gage comprising a window selectively positioned on reaction chamber 28 to gage a drop of volume of less than about 25% or a liquid leveler can measure the remaining unreacted fuel. A hydrometer, which measures the volume displaced by an object of known mass and which is a known instrument for the direct measurement of the density of a liquid, can be incorporated directly into or on reaction chamber 28. The hydrometer comprises a graduated stem with a weighted bulb to make the stem stand upright. As the density changes, the height of the stem changes. This can be used to gage the amount of remaining unreacted fuel. A calibration that takes into account the changes in height of the stem from start to finish and the decrease in volume can be readily constructed to measure the remaining unreacted fuel. A pycnometer can also be used to measure density.

Figure 6A:
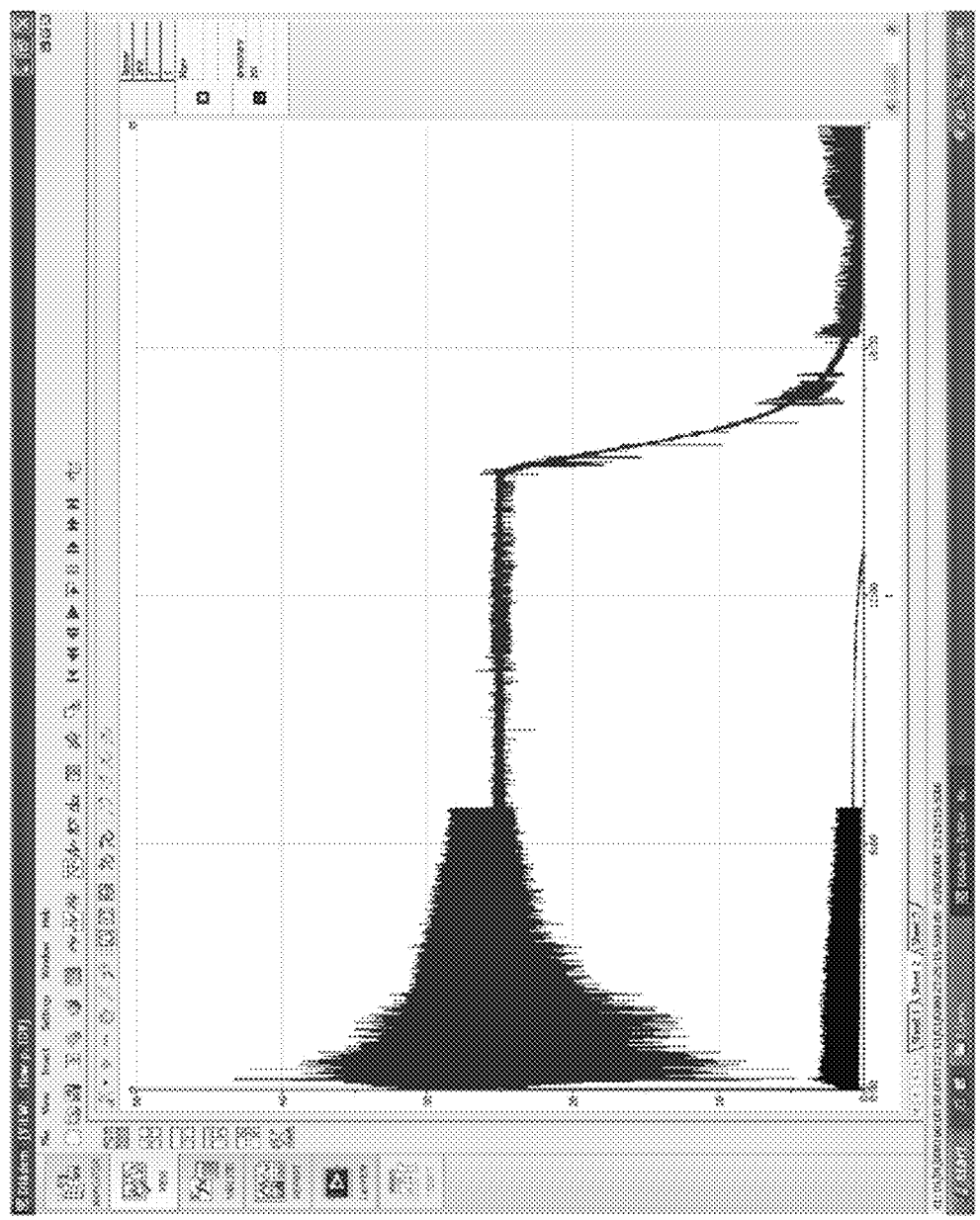
FIGS. 6A to 6C are hydrogen output test results from a gas-generating apparatus of the present invention.
Figure 6B:
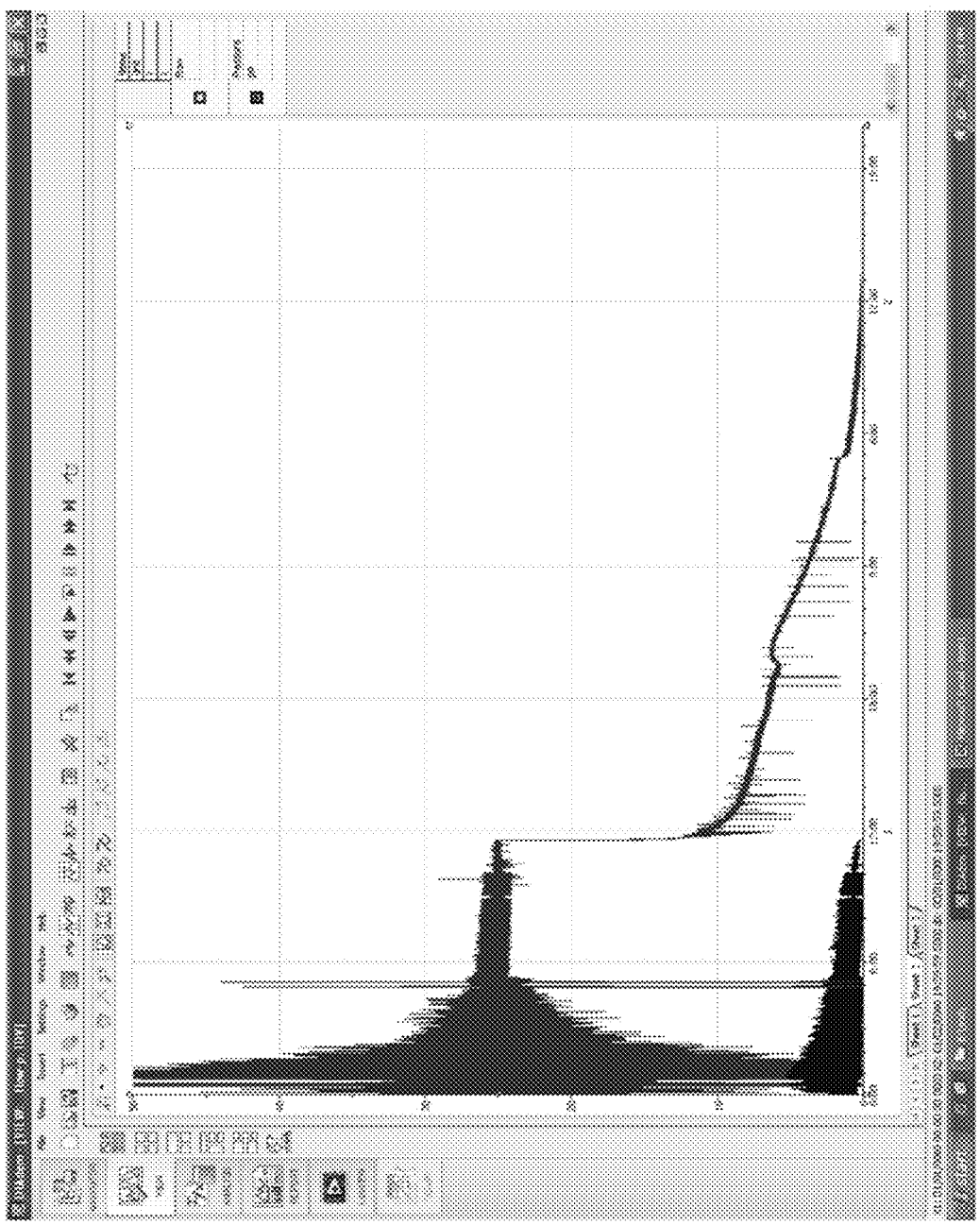
Figure 6C:
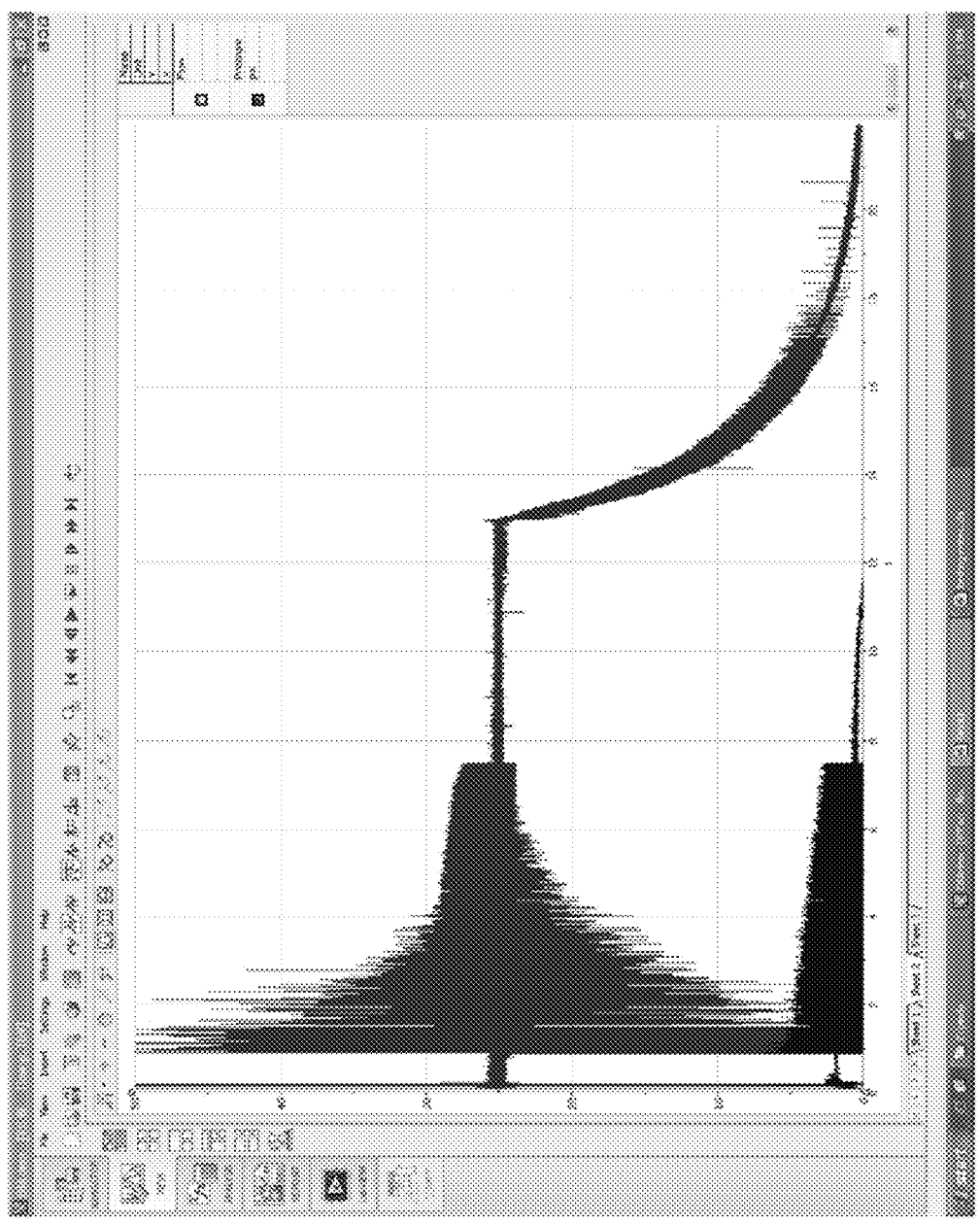

A hydrogen-generating apparatus 10 as described with reference to FIGS. 2E-2G was built and tested. The test system utilized a fuel mixture comprising 10 g $NaBH_4$ dissolved in 50 ml 0.5% NaOH (aq). The catalyst used was between 40 and 50 mg of CoB deposited on a flat disk shaped nickel foam. Three test runs of apparatus 10 are shown in FIGS. 6A to 6C, and display the gas flow rate and output gas pressure. When tested, the hydrogen-generating apparatus so configured produced a steady supply of hydrogen gas at a flow rate of 25 ml/min at pressures of between approximately 0 and 2 psi for a period of at least between 11.5 and 14 hours.

After the hydrogen is produced in hydrogen-generator 10, it is transported to fuel cell-fuel regulator or regulator 200, as shown in FIG. 7A. Regulator 200 has shuttle 202, which has a large end and a small end. The large end is in contact with and is supported by diaphragm 204 and the small end is in contact with and is supported by diaphragm 206. These diaphragms are flexible and can move along with the movement of shuttle 202. Additionally, diaphragms 204 and 206 may have a certain amount of springiness that tends to return the diaphragms to the relaxed positions. Regulator 200 also has hydrogen inlet 208, which is located proximate to diaphragm 206 and the small end of shuttle 202. Also located proximate thereto is flow path 210 which begins at diaphragm 206 and terminates at fuel cell inlet 212. Fuel cell inlet 212 is connected to anode flow path 214 of fuel cell 216, or to the anode side of fuel cell 216. Anode flow path 214 terminates at fuel cell outlet 218. Preferably anode flow path 214 has a tortuous path as shown to increase its length. Fuel cell outlet 218 is connected to chamber 220, which is bordered by diaphragm 204 and the large end of shuttle 202. Chamber 220 has relief valve 222, which can be a ball valve, to relieve the pressure within chamber 220, when it reaches above a threshold pressure.

The produced hydrogen, which is typically at relatively high pressure, enters regulator 200 at hydrogen inlet 208. Initially, the pressure in chamber 220 is relatively low either at start-up or first use. The hydrogen pressure pushes shuttle 202 toward the right, as illustrated in FIG. 7B, and diaphragm 206 bows to connect hydrogen inlet 208 to flow path 210, as shown. The hydrogen then flows into fuel cell inlet 212 and to anode flow path 214 of fuel cell 216. As discussed above, hydrogen is consumed in fuel cell 216 as the fuel cell generates electricity to power an electric/electronic device. Depending on the electrical load required by the device, an amount of residual hydrogen exits fuel cell outlet 218 into chamber 220.

When the electrical load is high, very little or no residual hydrogen leaves fuel cell 216 and shuttle 202 remain in the open configuration of FIG. 7B. However, when the electrical demand from the device is low, more residual hydrogen leaves fuel cell 216 into chamber 220, thereby increasing the pressure of chamber 220. Higher pressure in chamber 220 pushes shuttle 202 toward the left to narrow the fluidic connection between hydrogen inlet 208 and flow path 210 to reduce the hydrogen flow. When the pressure in chamber 220 is sufficiently high, it can close this fluidic connection thereby stopping the flow of hydrogen. While the pressure in chamber 220 can be lower than the pressure at hydrogen inlet 208, due to hydrogen consumption at the fuel cell, the pressure of chamber 220 can generate a force (F=pressure*area) sufficient to stop the inflow of hydrogen due to the large end of shuttle 202 facing chamber 220. When hydrogen usage increases, the pressure of chamber 220 decreases and shuttle 202 again moves to the right to open regulator 200.

When the pressure of chamber 220 is high, relief valve 222 vents the excess hydrogen preferably to a hydrogen recombiner 24 or other devices to neutralize hydrogen. Relief valve 222 prevents the situation where the pressure in chamber 220 can permanently shut down regulator 200. For example, if the pressure of chamber 220 approaches the pressure level at hydrogen inlet 208, due to the size difference between the two ends of shuttle 202, shuttle 202 may not be able to move to the right to open the regulator. In one example, relief valve 222 should vent when the pressure of chamber 220 is at or below: (Area of small end of shuttle 202/Area of the large end of shuttle 202)*inlet hydrogen pressure.

An advantage of regulator 200 is that the fuel cell and/or the electrical load on the fuel cell are used to regulate the flow of hydrogen through the fuel cell. When the load is high, regulator 200 remains open or mostly open. When the load is low, regulator 200 automatically readjusts the amount of hydrogen needed by the fuel cell, regulator 200 can reduce the amount of hydrogen reaching the fuel cell or stop the flow of hydrogen. Hence, when the electrical load is low, no hydrogen is wasted. Referring to FIG. 7C, which is an idealized graph of hydrogen pressure drops along anode flow path 214 between inlet 212 and outlet 218. High hydrogen usage or high electrical load is represented by curve A and successively lower hydrogen usages are represented by curves B-D. A constant flow of hydrogen at maximum load would be wasteful at lower hydrogen usage or lower load. A slower flow would experience lowering pressure similar to progressing from curve A→B→C→D. In the inventive regulator, during operation the pressure curve progresses from curve A→B→A, repeatedly.

Regulator 200 can also be used to replace an electro-mechanically actuated or other type of purging system used in conventional systems. In these systems, decreasing performance from the last cell in a line of fuel cells is used to actuate a purge valve. This regulator eliminates the need to electrically sense the output of the last cell and convert that signal to actuate a solenoid valve. A decrease in hydrogen pressure at outlet 218 will increase the opening at the inlet 212 of the regulator and supply more hydrogen to the fuel cells without any electrical signal being generated. A more complex spring based regulator with modified internal piping may also be used.

As discussed in parent provisional application 61/140,313, previously incorporated by reference, it is advantageous to balance the thermodynamics of the hydrogen generator to obtain efficient hydrogen production. Similarly, the amount of catalyst loading, i.e. the amount of catalyst used to aid in the reaction to produce hydrogen, and the thermal mass of the catalyst, should be maximized. The pressure and temperature of the reaction should also be controlled to minimize the possible precipitation of byproduct crystals within the gas generator. These disclosures from the parent '313 patent application are applicable to the gas generator and to the reactor buoy disclosed herein.

Other embodiments of the present invention will be apparent to those skilled in the art from consideration of the present specification and practice of the present invention disclosed herein. For example, any of the catalyst sealing members disclosed herein can be controlled by an electronic controller, such as a microprocessor. Likewise, the components of one embodiment, such as the actuator or the hydrogen consumer, can be used with another embodiment. Also, a pressure regulating valve may be included to reduce the variability in the pressure of the hydrogen stream being directed to the fuel cell. It is intended that the present specification and examples be considered as exemplary only with a true scope and spirit of the invention being indicated by the following claims and equivalents thereof.

We claim:

1. A reaction chamber for producing hydrogen for fuel cells comprising:
   a housing containing a fuel mixture formed by dissolving a solid fuel in a liquid fuel to produce hydrogen in the presence of a catalyst;
   at least one gas permeable liquid impermeable membrane component to separate hydrogen produced from the fuel and reaction by-products and configured to transport hydrogen to the fuel cell; and
   a catalyst sealing member, the catalyst sealing member containing the catalyst and comprising a reference pressure chamber being capable of reversibly expanding and contracting in response to a difference between a reference pressure and an internal pressure of the reaction chamber,
   wherein the catalyst sealing member comprises an elastomeric chamber;
   wherein the catalyst sealing member is open when the internal pressure is equal to or less than the reference pressure of the reference pressure chamber such that, during use, the catalyst is exposed to the fuel mixture,
   wherein the catalyst sealing member is closed isolating the catalyst from the fuel mixture, when the internal pressure is greater than the reference pressure;
   wherein the catalyst sealing member retains substantially no residual fuel mixture when the catalyst sealing member is closed; and,
   wherein the elastomeric chamber has one or more deformed walls when the catalyst sealing member is closed.

2. The reaction chamber of claim 1, wherein the reference pressure is atmospheric pressure.

3. The reaction chamber of claim 1, wherein the catalyst sealing member comprises a cup disposable against a sealing member, wherein the cup is displaced away from the sealing member when the catalyst sealing member is open and the cup is disposed against the sealing member when the catalyst sealing member is closed.

4. The reaction chamber of claim 1, wherein the reference pressure chamber is fluidically connected to the exterior of the housing.

5. A gas-generating apparatus comprising:
a housing having an outlet port and a pressure relief valve; and
a reaction chamber located within the housing of the gas-generating apparatus, the reaction chamber comprising at least one gas permeable, liquid impermeable membrane providing a gas-conduit between the reaction chamber and the outlet port and pressure relief valve, the reaction chamber characterized as having an internal pressure and which, during use, contains a fuel mixture that produces a gas in the presence of a catalyst;
the reaction chamber containing a catalyst sealing member, the catalyst sealing member containing the catalyst and comprising a reference pressure chamber configured to communicate with a reference gas at a reference pressure, the reference pressure chamber being capable of reversibly expanding and contracting in response to a difference between the reference pressure and the internal pressure of the reaction chamber,
wherein the catalyst sealing member comprises an elastomeric chamber;
wherein the catalyst sealing member is open when the internal pressure of the reaction chamber is equal to or less than the reference pressure;
wherein the catalyst sealing member is closed when the reference pressure is greater than the internal pressure of the reaction chamber;
wherein the catalyst sealing member retains substantially no residual fuel mixture when the catalyst sealing member is closed; and,
wherein the elastomeric chamber has one or more deformed walls when the catalyst sealing member is closed.

6. The gas-generating apparatus of claim 5, wherein reference pressure chamber has a substantially cylindrical shape.

7. The gas-generating apparatus of claim 5, wherein the reference pressure chamber is fluidically connected to the outside of the housing, such that the reference pressure is atmospheric pressure.

8. The gas-generating apparatus of claim 5, wherein the pressure relief valve is in fluidic communication with a hydrogen consumer.

9. The gas-generating apparatus of claim 8, wherein the hydrogen consumer comprises a PEM fuel cell configured to convert excess hydrogen gas into water.

10. The gas-generating apparatus of claim 8, wherein the hydrogen consumer comprises a compound that reacts with free hydrogen to form an inert compound that converts hydrogen to an inert state.

11. The gas-generating apparatus of claim 5, wherein the catalyst sealing member is configured such that a first portion of the catalyst sealing member twists relative to a second portion of the catalyst sealing member when the catalyst sealing member changes from open to closed.

12. The reaction chamber of claim 1, wherein the catalyst sealing member is configured such that a first portion of the catalyst sealing member twists relative to a second portion of the catalyst sealing member when the catalyst sealing member changes from open to closed.

13. The reaction chamber of claim 1, wherein the reaction chamber further comprises:
a second catalyst sealing member, the second catalyst sealing member containing the catalyst and comprising a second reference pressure chamber being capable of reversibly expanding and contracting in response to a difference between a second reference pressure and the internal pressure of the reaction chamber,
wherein the second catalyst sealing member comprises a second elastomeric chamber;
wherein the second catalyst sealing member is open when the internal pressure is equal to or less than the second reference pressure of the second reference pressure chamber such that, during use, the catalyst is exposed to the fuel mixture,
wherein the second catalyst sealing member is closed isolating the catalyst from the fuel mixture, when the internal pressure is greater than the second reference pressure;
wherein the second catalyst sealing member retains substantially no residual fuel mixture when the second catalyst sealing member is closed; and,
wherein the second reference pressure is different than the reference pressure.

14. The gas-generating apparatus of claim 5, wherein the gas-generating apparatus further comprises:
a second catalyst sealing member disposed within the reaction chamber, the catalyst sealing member containing the catalyst and comprising a second reference pressure chamber configured to communicate with a reference gas at a second reference pressure, the second reference pressure chamber being capable of reversibly expanding and contracting in response to a difference between the second reference pressure and the internal pressure of the reaction chamber,
wherein the second catalyst sealing member comprises an elastomeric chamber;
wherein the second catalyst sealing member is open when the internal pressure of the reaction chamber is equal to or less than the second reference pressure;
wherein the second catalyst sealing member is closed when the second reference pressure is greater than the internal pressure of the reaction chamber;
wherein the second catalyst sealing member retains substantially no residual fuel mixture when the second catalyst sealing member is closed; and,
wherein the second reference pressure is different than the reference pressure.

* * * * *